United States Patent
Knapp et al.

(10) Patent No.: US 11,838,751 B2
(45) Date of Patent: Dec. 5, 2023

(54) PRIVACY PRESERVING MESSAGE BLINDING

(71) Applicant: SEMTECH (INTERNATIONAL) AG, Rapperswil-Jona (CH)

(72) Inventors: Joseph Alfonso Knapp, Morgan Hill, CA (US); Thomas Eirich, Rapperswil-Jona (CH); Michael Peter Kuyper, Rapperswil-Jona (CH); Alexandru Mircea Caracas, Rapperswil-Jona (CH); Thorsten Kramp, Rapperswil-Jona (CH)

(73) Assignee: Semtech (International) AG, Rapperswill (CH)

( * ) Notice: Subject to any disclaimer, the term of this patent is extended or adjusted under 35 U.S.C. 154(b) by 0 days.

(21) Appl. No.: 16/488,537

(22) PCT Filed: Oct. 11, 2017

(86) PCT No.: PCT/US2017/056176
§ 371 (c)(1),
(2) Date: Aug. 23, 2019

(87) PCT Pub. No.: WO2018/156206
PCT Pub. Date: Aug. 30, 2018

(65) Prior Publication Data
US 2020/0068390 A1    Feb. 27, 2020

Related U.S. Application Data

(60) Provisional application No. 62/463,401, filed on Feb. 24, 2017.

(51) Int. Cl.
*H04W 12/02* (2009.01)
*H04L 9/08* (2006.01)
(Continued)

(52) U.S. Cl.
CPC ............ *H04W 12/02* (2013.01); *H04L 9/0866* (2013.01); *H04L 63/0428* (2013.01); *H04W 12/04* (2013.01); *H04W 12/06* (2013.01)

(58) Field of Classification Search
CPC ............. H04L 2209/04; H04L 63/0414; H04L 63/0428; H04L 9/0866; H04W 12/001;
(Continued)

(56) References Cited

U.S. PATENT DOCUMENTS

2004/0083362 A1* 4/2004 Park ................... H04L 63/0457
713/162
2005/0086470 A1 4/2005 Strobl et al.
(Continued)

FOREIGN PATENT DOCUMENTS

KR    10-2004-0077569    9/2004
KR    10-2016-0127511    11/2016

OTHER PUBLICATIONS

International Search Report, International Application No. PCT/US17/56176, dated Jan. 5, 2018, 1 page.
(Continued)

*Primary Examiner* — Derrick W Ferris
*Assistant Examiner* — M Mostazir Rahman
(74) *Attorney, Agent, or Firm* — King & Spalding LLP

(57) ABSTRACT

A method for transmitting message frames, comprising: generating, by an end device comprising a processor, a first message frame portion comprising a first plain header; obtaining a device identifier (DevEUI) and a header blinding key (HdrBKey); generating a first header mask using the DevEUI and the HdrBKey; obtaining a first blinded header by applying the first header mask to the first plain header; obtaining a first updated message frame portion by updating the first message portion using the first blinded header; generating a first blinded message frame comprising the first
(Continued)

updated message frame portion; and transmitting the first blinded message frame to a network gateway.

12 Claims, 20 Drawing Sheets

(51) Int. Cl.
*H04L 9/40* (2022.01)
*H04W 12/04* (2021.01)
*H04W 12/06* (2021.01)

(58) Field of Classification Search
CPC ..... H04W 12/02; H04W 12/04; H04W 12/06; H04W 12/1006
See application file for complete search history.

(56) References Cited

U.S. PATENT DOCUMENTS

| | | | |
|---|---|---|---|
| 2006/0153375 A1* | 7/2006 | Yi | .......................... H04L 63/068 380/44 |
| 2010/0098080 A1 | 4/2010 | Stacey | |
| 2010/0278533 A1 | 11/2010 | Julien et al. | |
| 2011/0194646 A1 | 8/2011 | Stedron et al. | |
| 2011/0194686 A1 | 8/2011 | Stedron et al. | |
| 2012/0117376 A1 | 5/2012 | Fink et al. | |
| 2012/0290830 A1 | 11/2012 | Resch et al. | |
| 2015/0200774 A1 | 7/2015 | Le Saint | |
| 2016/0241389 A1* | 8/2016 | Le Saint | ............... H04L 9/0844 |
| 2016/0366160 A1 | 12/2016 | Kapoor et al. | |
| 2018/0139213 A1* | 5/2018 | Shin | ........................ H04L 51/00 |

OTHER PUBLICATIONS

Extended European Search Report dated Dec. 10, 2020 in European Application No. 17897382.2.
Farrell, et al., "LPWAN Overview; draft-farrell-Ipwan-overview-02.txt", LPWAN Overview; DRAFT-FARRELL-LPWAN-OVERVIEW-02.TXT, Internet Engineering Task Force, IETF; Standardworkingdraft, Internet Society (ISOC) 4, Rue Des Falaises CH—1205 Geneva, Switzerland, Oct. 30, 2016, pp. 1-33, XP015116218.
Notice of Non-Final Rejection dated Jan. 15, 2020 in corresponding Korean Application No. 10-2019-7027914.
LoRa Alliance, LoRaWAN TM Specification V1.0, LoRa Alliance, published Jan. 2015.
Chinese Office Action for CN 201780089976.2 dated Jan. 6, 2022.

* cited by examiner

PRIVACY PRESERVING MESSAGE BLINDING

CROSS-REFERENCE TO RELATED APPLICATIONS

The present application is related to U.S. Provisional Application No. 62/463,401, filed on Feb. 24, 2017. The entire contents of the before-mentioned application is incorporated by reference as part of the disclosure of this PCT application.

BACKGROUND

The present invention aims to solve privacy vulnerabilities in existing radio structures such as low power wide area networks (LPWANs). Thus, embodiments of the present invention provide a means and a method to encrypt and de-encrypt transmitted messages based on the LoRaWAN protocol specification.

SUMMARY

A method for transmitting message frames that includes generating, by an end device comprising a processor, a first message frame portion comprising a first plain header. Said method that obtains a device identifier (DevEUI) and a header blinding key (HdrBKey). Said method that generates a first header mask using the DevEUI and the HdrBKey, and obtaining a first blinded header by applying the first header mask to the first plain header. Said method that obtains a first updated message frame portion by updating the first message portion using the first blinded header, generates a first blinded message frame comprising the first updated message frame portion, and transmits the first blinded message frame to a network gateway.

A method for transmitting message frames that includes obtaining, by a network host and for each end device of a device population, a device identifier (DevEUI), a header blinding key (HdrBKey), and a device address (DevAddr). Said method that obtains a set of first header masks by generating, for each end device of the device population, a first header mask using the DevEUI and the HdrBKey, and generating, for each end device of the device population, a first candidate plain header (CPH) comprising the DevAddr. Said method that obtains a set of first candidate blinded headers (CBHs) by applying, for each end device of the device population, the first header mask to the first CPH, and obtaining, from a network gateway, a first message frame comprising a first blinded header. Said method that compares the first blinded header to each first CBH of the set of first CBHs, and identifying, based on the comparing, a first fixed-bit-matching CBH of the set of first CBHs comprising a first set of fixed bits that match a second set of fixed bits included in the first blinded header. Said method that obtains a first plain header by applying one first header mask of the set of first header masks to the first blinded header, wherein the one first header mask corresponds to the first fixed-bit-matching CBH. Said method that obtains a first unblended message frame by updating the first message frame using the first plain header, and transmitting the first unblended message frame to an application system.

An end device, comprising: a communication interface, and a processor operatively connected to the communication interface and on which a blinding filter is executing, wherein the processor is configured to generate a first message frame portion comprising a first plain header. The processor is configured to obtain a device identifier (DevEUI) and a header blinding key (HdrBKey). The processor is configured to generate, using the blinding filter, a first header mask using the DevEUI and the HdrBKey. The processor is configured to obtain, using the blinding filter, a first blinded header by applying the first header mask to the first plain header, and generate a first blinded message frame comprising the first updated message frame portion. The processor is configured to transmit, using the communication interface, the first blinded message frame to a network gateway.

A network host that includes a communication interface. It also includes a processor operatively connected to the communication interface and on which a blinding filter is executing, wherein the processor is configured to obtain, for each end device of a device population, a device identifier (DevEUI) and a header blinding key (HdrBKey), and a device address (DevAddr). The processor is configured to obtain, using the blinding filter, a set of first header masks by generating, for each end device of the device population, a first header mask using the DevEUI and the HdrB Key. The processor is configure to generate, for each end device of the device population, a first candidate plain header (CPH) comprising the DevAddr. The processor is configure to obtain, using the blinding filter, a set of first candidate blinded headers (CBHs) by applying, for each end device of the device population, the first header mask to the first CPH. The processor configured to obtain, using the communication interface and from a network gateway operatively connected to the network host, a first message frame comprising a first blinded header. The processor configured to compare the first blinded header to each first CBH of the set of first CBHs, and identify, based on the comparing, a first fixed-bit-matching CBH of the set of first CBHs comprising a first set of fixed bits that match a second set of fixed bits included in the first blinded header. The processor configured to obtain a first plain header by applying one first header mask of the set of first header masks to the first blinded header, wherein the one first header mask corresponds to the first fixed-bit-matching CBH. The processor configured to obtain a first unblinded message frame by updating the first message frame using the first plain header, and transmit, using the communication interface, the first unblended message frame to an application system.

A system comprising a network gateway and an end device. The end device comprises a first communication interface and a first processor on which a first blinding filter is executing, wherein the end device is operatively connected to the network gateway, wherein the first processor is configured to generate a first message frame portion comprising a first plain header. The first processor also obtains a device identifier (DevEUI) and a header blinding key (HdrBKey), and generates, using the first blinding filter, a first header mask using the DevEUI and the HdrBKey. The first processor also obtains, using the first blinding filter, a first blinded header by applying the first header mask to the first plain header, and obtains a first updated message frame portion by updating the first message portion using the first blinded header. The first processor generates a first blinded message frame comprising the first updated message frame portion, and transmits, using the first communication interface, the first blinded message frame to the network gateway.

A non-transitory computer readable medium (CRM) comprising computer readable program code, which when executed by a processor, enables the processor to generate a first message frame portion comprising a first plain header, and obtain a device identifier (DevEUI) and a header blinding key (HdrBKey). The processor also generates a first header mask using the DevEUI and the HdrB Key, and obtains a first blinded header by applying the first header mask to the first plain header. The processor also obtains a first updated message frame portion by updating the first message portion using the first blinded header, generates a first blinded message frame comprising the first updated message frame portion, and transmits the first blinded message frame to the network gateway.

A non-transitory computer readable medium (CRM) comprising computer readable program code, which when executed by a processor, enables the processor to obtain, for each end device of a device population, a device identifier (DevEUI), a header blinding key (HdrBKey), and a device address (DevAddr). The processor obtains a set of first header masks by generating, for each end device of the device population, a first header mask using the DevEUI and the HdrBKey, and generate, for each end device of the device population, a first candidate plain header (CPH) comprising the DevAddr. The processor is configured to obtain a set of first candidate blinded headers (CBHs) by applying, for each end device of the device population, the first header mask to the first CPH, and obtain, from a network gateway, a first message frame comprising a first blinded header. The processor is configured to compare the first blinded header to each first CBH of the set of first CBHs, and identify, based on the comparing, a first fixed-bit-matching CBH of the set of first CBHs comprising a first set of fixed bits that match a second set of fixed bits included in the first blinded header. The processor is configured to obtain a first plain header by applying one first header mask of the set of first header masks to the first blinded header, wherein the one first header mask corresponds to the first fixed-bit-matching CBH. The processor is configured to obtain a first unblinded message frame by updating the first message frame using the first plain header, and transmit the first unblinded message frame to an application system.

DETAILED DESCRIPTION

Figure 1A:
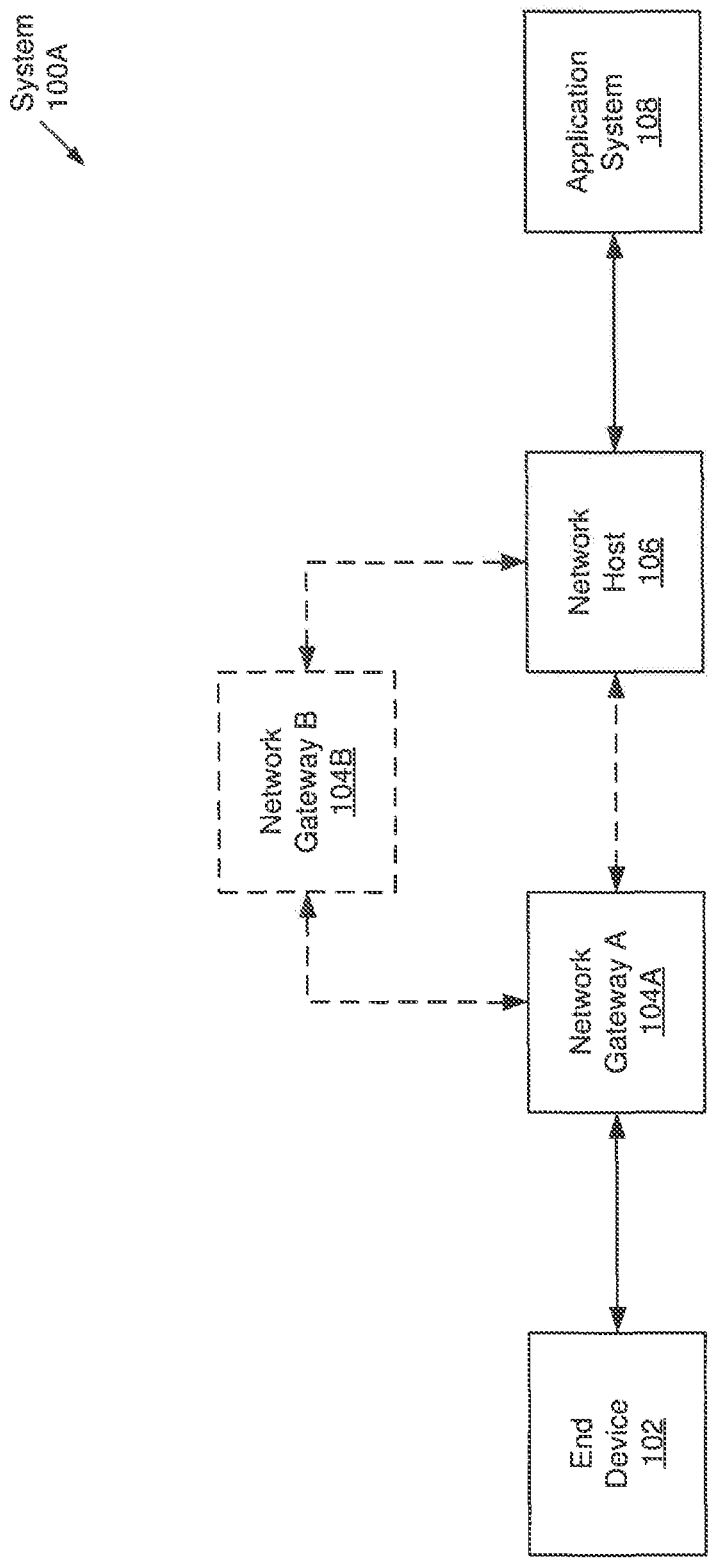
FIG. 1A shows a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of the embodiments disclosed herein. However, it will be apparent to one of ordinary skill in the art that embodiments disclosed herein may be practiced without these specific details. In other instances, well-known features have not been described in detail to avoid unnecessarily complicating the description.

In the following description of FIGS. 1A-10B, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein relate to privacy preservation. Specifically, one or more embodiments in this disclosure entail the blinding of header information associated with radio transmissions, which are typically susceptible to eavesdropping and/or interception. More specifically, the blinding (or encrypting), as well as the eventual unblinding (or decrypting), of the header information is performed using a device-specific header blinding key (HdrBKey), which is known only to an end device and a network host managing the end device. In one or more other embodiments disclosed herein, the end device (i.e., a network-enabled physical object) may include the capability to monitor and adjust its own parameters to optimize end device operations. Similarly, the network host may include the capability to monitor and adjust network-wide parameters to optimize network operations.

In one or more embodiments disclosed herein, the preservation of privacy through message blinding utilizes, at least in part, the LoRaWAN protocol. One version of the LoRaWAN protocol is defined in the document entitled "LoRa Alliance LoRaWAN Specification" version 1.0.2 dated July 2016. The LoRaWAN protocol is hereby incorporated by reference in its entirety. Further, embodiments disclosed herein are not limited to a particular version of the LoRaWAN protocol. As will be clear to one of ordinary skill in the art based on the exemplary embodiments discussed herein, the use of message blinding need not be restricted to the LoRaWan protocol and other protocols may also benefit from incorporations of the concepts, methods, systems, and devices discussed herein.

In one or more embodiments disclosed herein, the preservation of privacy through message blinding utilizes, at least in part, the Institute of Electrical and Electronics Engineers (IEEE) 802.15.4 standard, which defines the operation of low-rate wireless personal area networks (LR-WPANs). One version of the IEEE 802.15.4 standard is defined in the document entitled "IEEE Standard for Local and metropolitan area networks—Part 15.4: Low-Rate Wireless Personal Area Networks (LR-WPANs)" version IEEE Std 802.15.4-2011 dated September 2011. The IEEE 802.15.4 standard is hereby incorporated by reference in its entirety. Further, embodiments disclosed herein are not limited to a particular version of the IEEE 802.15.4 standard.

FIG. 1A shows a system in accordance with one or more embodiments disclosed herein. The system (100A) includes an end device (102), a network gateway (104A), a network host (106), and an application system (108). Each of these components is described below.

In one or more embodiments disclosed herein, an end device (102) may be any network-enabled, physical object (including software and/or firmware) that includes at least one sensor. The term "network-enabled" may, in one or more embodiments disclosed herein, refer to including the functionality to collect and exchange information over a network, such as a local area network (LAN) or a wide area network (WAN). In one or more embodiments disclosed herein, an end device (102) may be an Internet of Things (IoT)-enabled, physical object. Examples of an end device (102) may include, but are not limited to, a mote, an appliance, a vehicle, a wearable or implantable device, and an urban or rural structure.

In one or more embodiments disclosed herein, an end device (102) may include functionality to gather sensor information using one or more on-board (or operatively connected) sensor(s). The end device (102) may include further functionality to transmit the aforementioned sensor information to a network gateway (104A). In one or more embodiments disclosed herein, the end device (102) and a network gateway (104A) may be operatively connected through a bidirectional, low power and long range (LoRa®) wireless communication link. In one or more embodiments disclosed herein, the LoRa® wireless communication link may employ a wireless modulation utilized for long range, low power, and low data rate applications. (LoRa is a registered trademark of Semtech Corporation). In one or more other embodiments disclosed herein, the end device (102) and a network gateway (104A) may be operatively connected through any other existing or future developed wireless communication link, such as, for example, Wifi, Bluetooth, Zigbee, Z-Wave, and cellular connections (e.g., 2G/3G/4G). Although embodiments below in general describe bidirectional communication between an end device (102) and a network gateway (104A), it will be appreciated by one of ordinary skill in the art in view of the concepts, methods, devices and systems described herein that unidirectional communication between, e.g., an end device (102) to a network gateway (104A), would also benefit from the privacy blinding discussed herein.

In one or more embodiments disclosed herein, an end device (102) may include further functionality to generate and transmit join request messages, and subsequently, receive join accept messages (see e.g., FIG. 5). Additionally, an end device (102) may include functionality to receive configuration update messages (see e.g., FIG. 9) and/or software and firmware updates as well. In one or more embodiments disclosed herein, an end device (102) may include further functionality to monitor, analyze, and optimize itself to improve operational management (see e.g., FIG. 8). In one or more embodiments disclosed herein, an end device (102) may include functionality to perform blinding and unblinding operations (see e.g., FIGS. 6A-7B). The end device (102) is described in further detail below with respect to FIG. 2A.

In one or more embodiments disclosed herein, a network gateway (104A) may be any internetworking, physical device (including software and/or firmware). The term "internetworking", in one or more embodiments disclosed herein, may refer to including the functionality to join together at least two networks that use different base protocols. Accordingly, in one embodiment disclosed herein, the network gateway (104A) may include functionality to bring together and/or mediate between the LoRaWAN protocol and the transmission control protocol/Internet protocol (TCP/IP). TCP/IP may be employed by the backhaul network in which the network host (106) and the application system (108) reside. In another embodiment disclosed herein, the network gateway (104A) may include functionality to bring together and/or mediate between any other existing or future developed wireless protocol and TCP/IP (or any other existing or future developed networking protocol). Examples of a network gateway (104A) include, but are not limited to, a network bridge, a protocol converter, a router, a network switch, a multilayer switch, an wireless access point, a network hub, and a network repeater.

In one or more embodiments disclosed herein, the above-mentioned backhaul network may be a medium through which the network gateway (104A), the network host (106), and an application system (108) are operatively (or communicatively) connected. The connections between these various components of the system (100A) may be wired and/or wireless, direct or indirect, temporary, permanent, and/or intermittent. Further, the backhaul network may be implemented using a local area network (LAN) or a wide area network (WAN), such as the Internet. Moreover, the backhaul network may employ any existing or future developed wired and/or wireless communication protocols, which include functionality to facilitate the exchange of information between at least the various components of the system (100A).

In one or more embodiments disclosed herein, a network gateway (104A) may include further functionality to obtain and relay information to/from the end device (102) and/or the network host (106). Specifically, in one or more embodiments disclosed herein, the network gateway (104A) may include functionality to receive LoRaWAN message frames from an end device (102). In one or more embodiments disclosed herein, the received LoRaWAN message frames may include blinded headers (discussed below). Subsequently, the network gateway (104A) may include functionality to encapsulate received LoRaWAN message frames into media access control (MAC) frames utilized by TCP/IP, and transmit the generated MAC frames to the network host (106). In one or more embodiments disclosed herein, the network gateway (104A) may also include functionality to receive MAC frames from the network host (106). The network gateway (104A) may subsequently include functionality to decapsulate received MAC frames to obtain the payloads (i.e., the content that the network host (106) may be attempting to transmit to an end device (102)) residing within. The network gateway (104A) may then include functionality to encapsulate the obtained payloads into LoRaWAN message frames utilized by the LoRaWAN protocol, and transmit the generated LoRaWAN message frames to the end device (102). One of ordinary skill in the art will appreciate that a network gateway (104A) may include other functionalities without departing from the scope of embodiments disclosed herein. The network gateway (104A) is discussed in further detail below with respect to FIG. 2B.

In one or more embodiments disclosed herein, the network host (106) may be any computing system (including software and/or firmware) that may be configured to generate, transmit, receive, and/or process MAC frames. In one embodiment disclosed herein, the network host (106) may be implemented on one or more physical server(s) (e.g., in a data center). In another embodiment disclosed herein, the network host (106) may be implemented on one or more virtual server(s), which may be cloud-based. In yet another embodiment disclosed herein, the network host (106) may be implemented on a combination of one or more physical and/or virtual servers. In still another embodiment disclosed herein, the network host (106) may be implemented on any one or more computing system(s) similar to the exemplary computing systems shown in FIGS. 10A and 10B.

In one or more embodiments disclosed herein, the network host (106) may include functionality to manage the system (100A). Specifically, to manage the system (100A), the network host (106) may include functionality to eliminate duplicate packets (e.g., MAC frames and LoRaWAN message frames), schedule acknowledgements, and adapt data rates. Further to adapting data rates, in one or more embodiments disclosed herein, the network host (106) may include further functionality to manage the data rate and radio frequency (RF) output for each end device (102) individually by employing an adaptive data rate (ADR) scheme. The network host (106) may include further functionality to implement packet routing, intelligent dynamic network gateway selection (for optimized traffic routing), and device authentication. In one or more embodiments disclosed herein, the network host (106) may include functionality to generate and transmit configuration update messages (see e.g., FIG. 9). In one or more embodiments disclosed herein, the network host (106) may include functionality to provide provisioning, administration, and reporting services to an application system (108).

In one or more embodiments disclosed herein, the network host (106) may include functionality to receive MAC frames from a network gateway (104A). As mentioned above, the received MAC frames may encapsulate LoRaWAN message frames originating from an end device (102). In one embodiment disclosed herein, the received LoRaWAN message frames may include blinded headers (see e.g., FIG. 4B). In such an embodiment, the received LoRaWAN message frames may further include, for example, sensor information collected and/or measured by the originating end device (102). In another embodiment disclosed herein, the received LoRaWAN message frames may be join request messages (see e.g., FIG. 5). The network host (106) may include further functionality to obtain the LoRaWAN message frames by decapsulating the received MAC frames. In one or more embodiments disclosed herein, the network host (106), similar to an end device (102), may include functionality to perform blinding and unblinding operations (see e.g., FIG. 6A-7B). Moreover, the network host (106) may include functionality to encapsulate LoRaWAN message frames (including unblinded headers) into MAC frames, and subsequently, transmit the generated MAC frames to an application system (108).

In one or more embodiments disclosed herein, the network host (106) may include additional functionality to dynamically allocate device addresses (DevAddr) for one or more end device(s) (102). The allocation may be performed in response to receiving join request messages from the end device(s) (102) (see e.g., FIG. 5). In one or more embodiments disclosed herein, a DevAddr may be a unique 32-bit hexadecimal number specifying the device address for an end device in the network/system (100A). In response to receiving join request messages, the network host (106) may include further functionality to generate and transmit join accept messages to an end device (102). In one or more embodiments disclosed herein, a join accept message may include pertinent information (e.g., a dynamic device address, session keys, and a header blinding key (discussed below)) necessary to activate the end device (102), and thus enable the end device (102) to securely communicate with the various other components of the system (100A).

Moreover, in one or more embodiments disclosed herein, the network host (106) may include functionality to receive MAC frames from an application system (108). In one embodiment disclosed herein, these received MAC frames may include instructions to control the actions of an end device (102) or software and/or firmware updates. The network host (106) may subsequently include functionality to forward these received MAC frames towards an end device (102) via a network gateway (104A). In addition, the network host (106) may include functionality to assess and optimize network operations by way of monitoring network operational parameters and adjusting network configuration parameters (see e.g., FIG. 9). In optimizing network operations, the network host (106) may also include functionality to affect end device operations through the generation and transmission of configuration update messages. One of ordinary skill in the art will now appreciate that the network host (106) may include other functionalities without departing from the scope of embodiments disclosed herein. The network host (108) is discussed in further detail below with respect to FIG. 2C.

In one or more embodiments disclosed herein, an application system (108) may be any computing system (see e.g., FIGS. 10A and 10B) that may be configured to acquire sensor information from, and subsequently control the actions of, an end device (102). In one embodiment disclosed herein, the application system (108) may be implemented using one or more physical machine(s) (e.g., in a data center). In another embodiment disclosed herein, the application system (108) may be implemented using one or more virtual machine(s), which may be cloud-based. In yet another embodiment disclosed herein, the application system (108) may be implemented using a combination of one or more physical and virtual machine(s). Examples of an application system (108) include, but are not limited to, desktop computers, laptop computers, tablet computers, servers, smartphones, gaming consoles, and workstations.

In one or more embodiments disclosed herein, an application system (108) may include functionality to receive MAC frames from the network host (106). The received MAC frames may include, for example, sensor information originating from an end device (102). An application system (108) may include further functionality to perform analytics on information received from an end device (102). In one or more embodiments disclosed herein, an application system (108) may also include functionality to generate instructions, commands, and/or software/firmware updates, which may subsequently be transmitted towards one or more end device(s) (102). One of ordinary skill in the art will now appreciate that an application system (108) may include additional or alternative functionalities without departing from the scope of the embodiments disclosed herein.

Figure 1B:
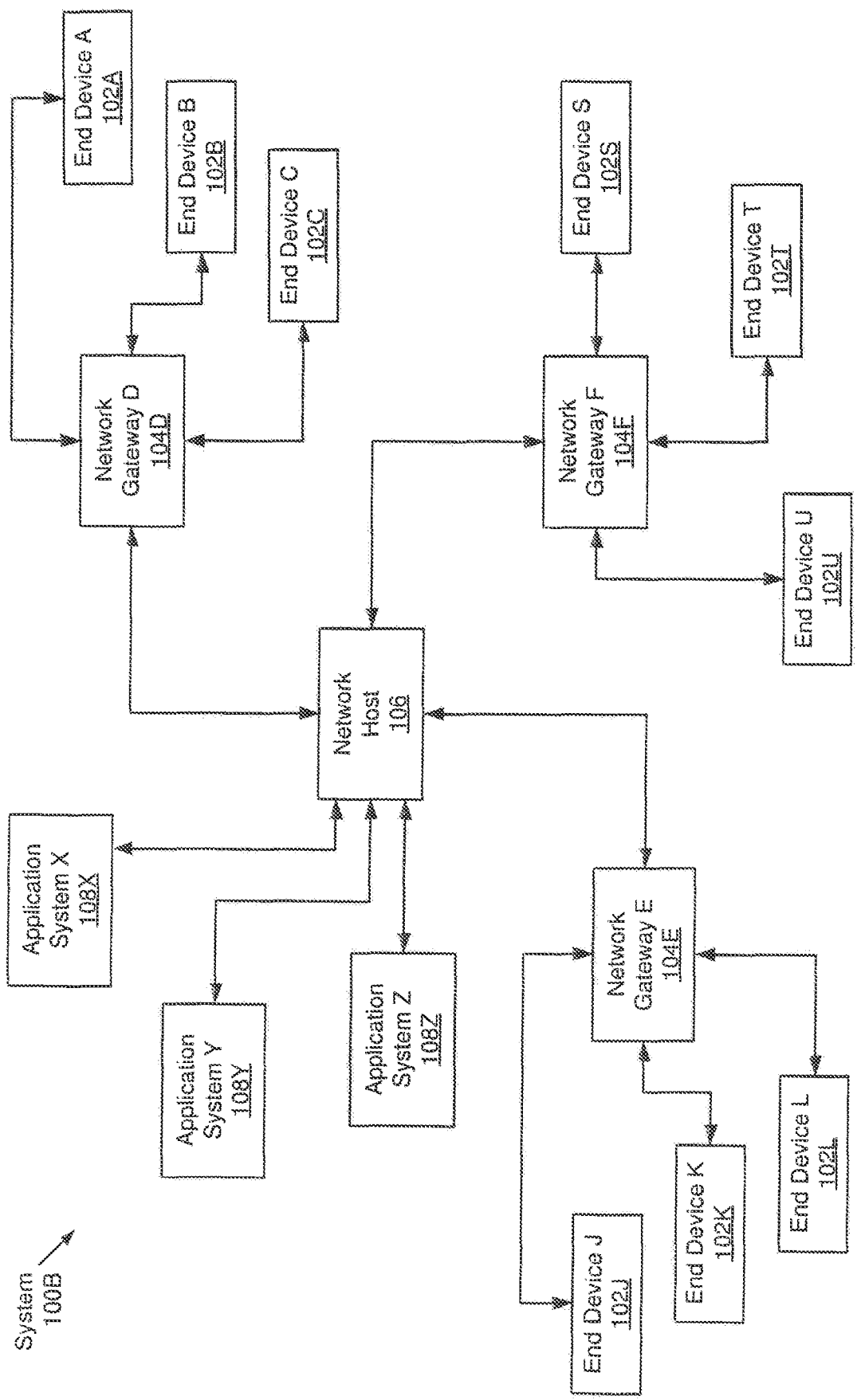
FIG. 1B shows a system in accordance with one or more embodiments disclosed herein.

While FIG. 1A shows a configuration of components, system configurations other than that shown in FIG. 1A may be used without departing from the scope of the embodiments disclosed herein. For example, as optionally shown in FIG. 1A, the system (100A) may include an additional network gateway (104B), which may server as a network repeater residing between the network gateway (104A) and the network host (106). By way of another example, as illustrated in FIG. 1B, a system (100B) may include multiple end devices (102A-102C, 102J-102L, 102S-102U), wherein each set is operatively connected to a designated network gateway (104D-104F). The multiple network gateways (104D-104F) may subsequently be operatively connected to the network host (106), which in turn, may be operatively connected to multiple application systems (108X-108Z).

Figure 2A:
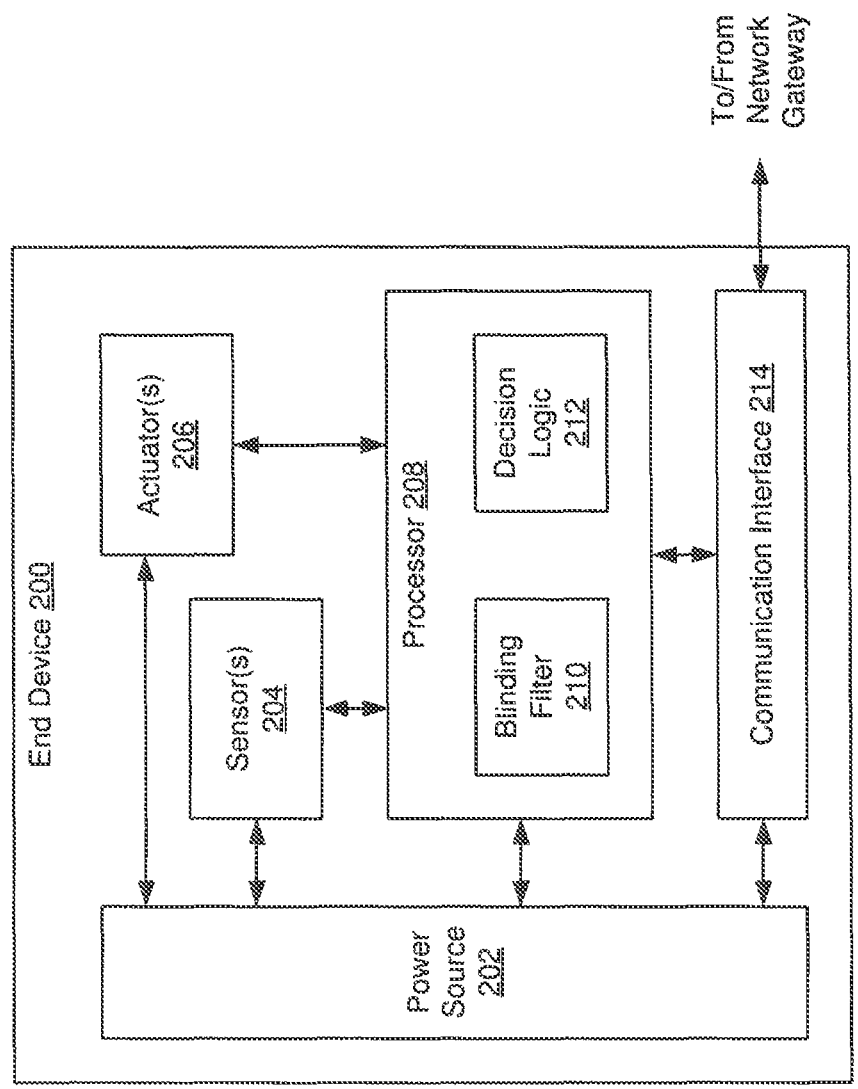
FIG. 2A shows an end device in accordance with one or more embodiments disclosed herein.

FIG. 2A shows an end device in accordance with one or more embodiments disclosed herein. The end device (200) includes a power source (202), one or more sensor(s) (204), zero or more actuators (206), one or more processor(s) (208), and a communication interface (214). Each of these components is described below.

In one or more embodiments disclosed herein, the power source (202) may be any electricity supplying device. In one or more embodiments disclosed herein, the power source (202) may be any electricity storage device. In one embodiment disclosed herein, the power source (202) may store and provide direct current (DC) power. In another embodiment disclosed herein, the power source (202) may store and provide alternating current (AC) power. In yet another embodiment disclosed herein, the power source (202) may store and provide a combination of DC and AC power. In one or more embodiments disclosed herein, the power source (202) may include functionality to provide power to the various other components (e.g., sensor(s) (204), actuator(s) (206) if any, processor(s) (208), and communication interface (214)) of the end device (200). The power source (202) may include further functionality to be rechargeable, such as, for example, a battery. In one or more embodiments disclosed herein, the power source (202) may include an integrated management system, which may oversee the charging and discharging of power to and from the power source (202). In such embodiments, the management system may also monitor measurements pertinent to the operation and regulation of the power source (202). The monitored measurements or properties may include, but are not limited to, temperature, pressure, leakage, capacitance, resistance, inductance, and energy consumption rate. In one or more embodiments disclosed herein, the power source (202) may operatively connect to an external power source (not shown) from which the power source (202) may draw power in order to recharge. One of ordinary skill in the art will now appreciate that the power source (202) may include additional circuitry or devices (e.g., voltage regulators, converters, transformers, etc.) for enabling the aforementioned functionalities and other functionalities without departing from the scope of the embodiments disclosed herein.

In one or more embodiments disclosed herein, a sensor (204) may be a physical device, including software. In one or more embodiments disclosed herein, a sensor (204) may be a physical device including firmware. In either of the aforementioned examples, the software or firmware is provided for transducing a measurable physical property (i.e., a property that may described a state of a physical system) into electrical signals or data. Examples of a physical property may include, but are not limited to, electrical charge, flow rate, frequency, intensity, location, momentum, pressure, strength, temperature, velocity, and volume. One of ordinary skill in the art will now appreciate that a sensor may detect and measure other physical properties depending on the application, the environment, or both in which an end device (200) is associated without departing from the scope of the embodiments disclosed herein. Examples of a sensor (204) may include, but are not limited to, an accelerometer, a global positioning system (GPS) device, a pressure sensor, a temperature sensor, a microphone, a camera, an electroencephalograph (EEG) (i.e., a bioelectricity sensor), and a photoionization detector (PID) (e.g., a gas or organic compound sensor). In one or more embodiments disclosed herein, the one or more sensor(s) (204) may be operatively connected to the power source (202) and the one or more processor(s) (208).

In one or more embodiments disclosed herein, an actuator (206) may be a physical device including software. In one or more embodiments disclosed herein, an actuator (206) may be a physical device including firmware. In either of the aforementioned cases, the software or firmware are provided to the sensor to enable transducing electrical signals or data into stimuli. In one or more embodiments disclosed herein, the nature of the stimuli may be kinetic, sensory, thermal, chemical, auditory, visual, any other type of stimulus, or a combination thereof. Examples of an actuator (206) may include, but are not limited to, a motor, a fluidic pump, a piezoelectric element, a speaker, and a display. One of ordinary skill in the art will now appreciate that an actuator may generate other stimuli depending on the application, the environment, or both in which an end device (200) is associated without departing from the scope of the embodiments disclosed herein. Further, in one or more embodiments disclosed herein, the zero or more actuators (206) may be operatively connected to the power source (202) and the one or more processor(s) (208).

In one or more embodiments disclosed herein, a processor (208) may be a collection of integrated circuits, including software, for executing instructions. In one or more embodiments disclosed herein, a processor (208) may be a collection of integrated circuits, including firmware, for executing instructions. The aforementioned instructions may correspond to computer readable program code, which when executed by the one or more processor(s) (208), enable the one or more processor(s) (208) to perform embodiments disclosed herein as shown in FIGS. 5-8. One of ordinary skill in the art will now appreciate that the computer readable program code may enable the one or more processor(s) (208) to perform additional operations without departing from the scope of the embodiments disclosed herein. Examples of a processor (208) may include, but are not limited to, a discrete processor, a digital signal processor (DSP), an application specific integrated circuit (ASIC), a microcontroller, a graphical processing unit (GPU), a field programmable gate array (FPGA), a single-board computer, and any combination thereof.

In one or more embodiments disclosed herein, a blinding filter (210) may be executing on the one or more processor(s) (208) of the end device (200). In one embodiment disclosed herein, the blinding filter (210) may be at least a portion of a computer program or a set of computer readable program code. When executed by the one or more processor(s) (208), the blinding filter (210) may enable the one or more processor(s) (208) to perform blinding or unblinding operations in accordance with embodiments disclosed herein (see e.g., FIGS. 6A-7B).

In one or more embodiments disclosed herein, a decision logic (212) may be executing on the one or more processor(s) (208) of the end device (200). In one embodiment disclosed herein, the decision logic (212) may be at least a portion of a computer program or a set of computer readable program code. When executed by the one or more processor(s) (208), the decision logic (212) may provide the one or more processor(s) (208) the functionality to monitor and optimize end device operations in accordance with embodiments disclosed herein (see e.g., FIG. 8).

In one or more embodiments disclosed herein, the communication interface (214) may be a physical device, including software, for receiving and transmitting LoRaWAN message frames. In one or more embodiments disclosed herein, the communication interface (214) may be a physical device, including firmware, for receiving and transmitting LoRaWAN message frames. The communication interface (214) may communicatively connect the end device (200) to one or more network gateway(s) (see e.g., FIG. 1A). In at least one embodiment disclosed herein, the communication interface (214) may employ the LoRa wireless modulation to receive and transmit information. In at least one embodiment disclosed herein, the communication interface (214) may employ the LoRaWAN protocol to receive and transmit information. In another embodiment disclosed herein, the communication interface (214) may employ any other existing or future developed modulation, stack, protocol, or combination thereof to receive and transmit information.

In one or more embodiments disclosed herein, the communication interface (214) may include functionality to receive join accept messages (originating from the network host) (see e.g., FIG. 5). The communication interface (214) may include additional functionality to receive configuration update messages (see e.g., FIG. 9) and software/firmware updates (originating from the network host). In one or more embodiments disclosed herein, the communication interface (214) may include further functionality to transmit sensor information (obtained from the one or more sensor(s) (204)) towards the network host via a network gateway. Examples of a communication interface (214) include, but are not limited to, a network interface controller, a network interface device, a network socket, and an antenna.

While FIG. 2A shows a configuration of components, end device configurations other than that shown in FIG. 2A may be used without departing from the scope of the embodiments disclosed herein.

Figure 2B:
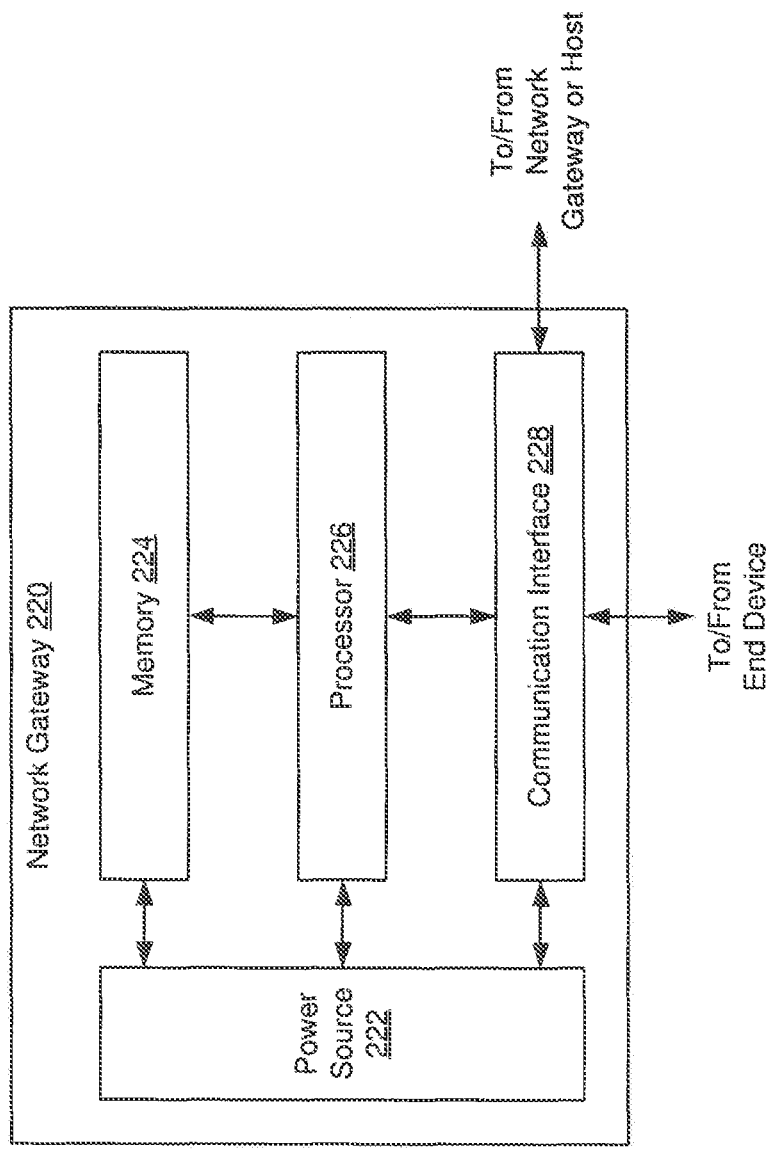
FIG. 2B shows a network gateway in accordance with one or more embodiments disclosed herein.

FIG. 2B shows a network gateway in accordance with one or more embodiments disclosed herein. The network gateway (220) includes a power source (222), memory (224), one or more processor(s) (226), and a communication interface (228). Each of these components is described below.

In one or more embodiments disclosed herein, the power source (222) may be substantially similar to the power source (202) described above with respect to end devices in FIG. 2A. In one or more embodiments disclosed herein, the memory (224) may be any non-persistent or volatile memory such as, for example, random access memory (RAM) and cache memory. The memory (224) may be operatively connected to the power source (222) and the one or more processor(s) (226). In one or more embodiments disclosed herein, the one or more processor(s) (226) may be substantially similar to the processor(s) (208) described above in FIG. 2A.

In one or more embodiments disclosed herein, the communication interface (228) may be a physical device, including software, for receiving and transmitting LoRaWAN message frames, MAC frames, or combinations thereof. In one or more embodiments disclosed herein, the communication interface (228) may be a physical device, including firmware, for receiving and transmitting LoRaWAN message frames, MAC frames, or a combination thereof. The communication interface (228) may communicatively connect the network gateway (220) to one or more end device(s) and the network host (see e.g., FIG. 1A). In one embodiment disclosed herein, the communication interface (228) may employ the LoRa wireless modulation, the LoRaWAN protocol, or a combination thereof to receive and transmit information. The communication interface (228) may additionally, or alternatively, employ the TCP/IP stack and protocol to receive and transmit information from/to systems residing in the backhaul network (described above). In another embodiment disclosed herein, the communication interface (228) may employ any other existing or future developed modulation, stack, protocol, or combination thereof to receive and transmit information. Examples of a communication interface (228) include, but are not limited to, a network interface controller, a network interface device, a network socket, an Ethernet port, and an antenna.

While FIG. 2B shows a configuration of components, network gateway configurations other than that shown in FIG. 2B may be used without departing from the scope of the embodiments disclosed herein.

Figure 2C:
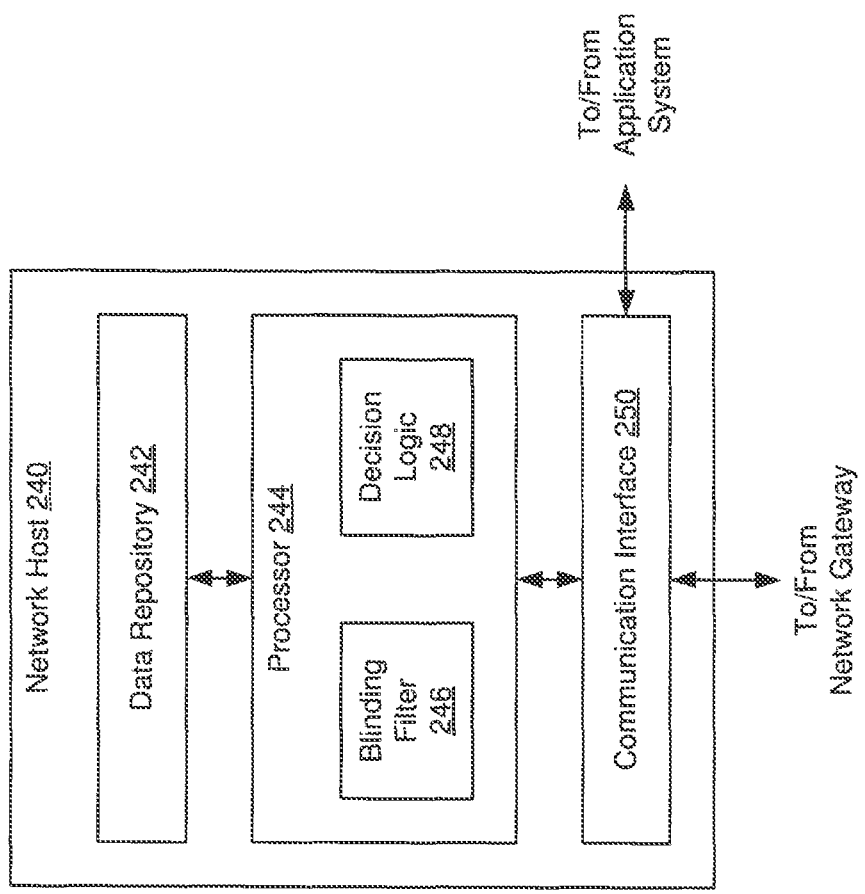
FIG. 2C shows a network host in accordance with one or more embodiments disclosed herein.

FIG. 2C shows a network host in accordance with one or more embodiments disclosed herein. The network host (240) includes a data repository (242), one or more processor(s) (244), and a communication interface (250). Each of these components is described below.

In one or more embodiments disclosed herein, the data repository (242) may be any type of storage unit, data structure, device, or combination thereof (e.g., a file system, a database, a collection of tables, or any other storage mechanism). The data repository (242) may include functionality to consolidate any information pertinent to embodiments disclosed herein including, but not limited to, a routing table for tracking which network gateway may be operatively connected to which end device, one or more network session key(s), one or more application session key(s), one or more header blinding key(s), and monitored data rates and RF outputs associated with each end device operatively connected to the network host (240). In one or more embodiments disclosed herein, the data repository (242) may be implemented using multiple storage units, data structures, or devices, which may or may not be of the same type or located at the same physical site. Examples of a data repository (242) include, but are not limited to, solid state drives, optical disc drives, magnetic storage, a cloud-based storage system, and any other persistent and non-volatile storage medium.

In one or more embodiments disclosed herein, the one or more processor(s) (244) of the network host (240) may be substantially similar to the processor(s) described above with respect to end devices or network gateways in FIG. 2A or 2B, respectively. Further, in one or more embodiments disclosed herein, a blinding filter (246) may be executing on the one or more processor(s) (224) of the network host (240). In one embodiment disclosed herein, the blinding filter (246) may be at least a portion of a computer program or a set of computer readable program code. When executed by the one or more processor(s) (244), the blinding filter (246) may enable the one or more processor(s) (244) to perform blinding or unblinding operations in accordance with embodiments disclosed herein (see e.g., FIGS. 6A-7B).

In one or more embodiments disclosed herein, a decision logic (248) may be executing on the one or more processor(s) (244) of the end device (240). In one embodiment disclosed herein, the decision logic (248) may be at least a portion of a computer program or a set of computer readable program code. When executed by the one or more processor(s) (244), the decision logic (248) may provide the one or more processor(s) (244) the functionality to monitor and optimize network operations in accordance with embodiments disclosed herein (see e.g., FIG. 9).

In one or more embodiments disclosed herein, the communication interface (250) may be a physical device, including software, for receiving and transmitting MAC frames. In one or more embodiments disclosed herein, the communication interface (250) may be a physical device, including firmware, for receiving and transmitting MAC frames. The communication interface (250) may communicatively connect the network host (240) to one or more network gateway(s) and one or more application system(s) (see e.g., FIG. 1B). In one embodiment disclosed herein, the communication interface (250) may employ the TCP/IP stack and protocol to receive and transmit information. In another embodiment disclosed herein, the communication interface (250) may employ any other existing or future developed networking stack, protocol, or combination thereof to receive and transmit information. Examples of a communication interface (250) include, but are not limited to, an Ethernet port, a network interface controller, a network interface device, a network socket, and an antenna.

While FIG. 2C shows a configuration of components, network host configurations other than that shown in FIG. 2C may be used without departing from the scope of the embodiments disclosed herein.

Figure 3:
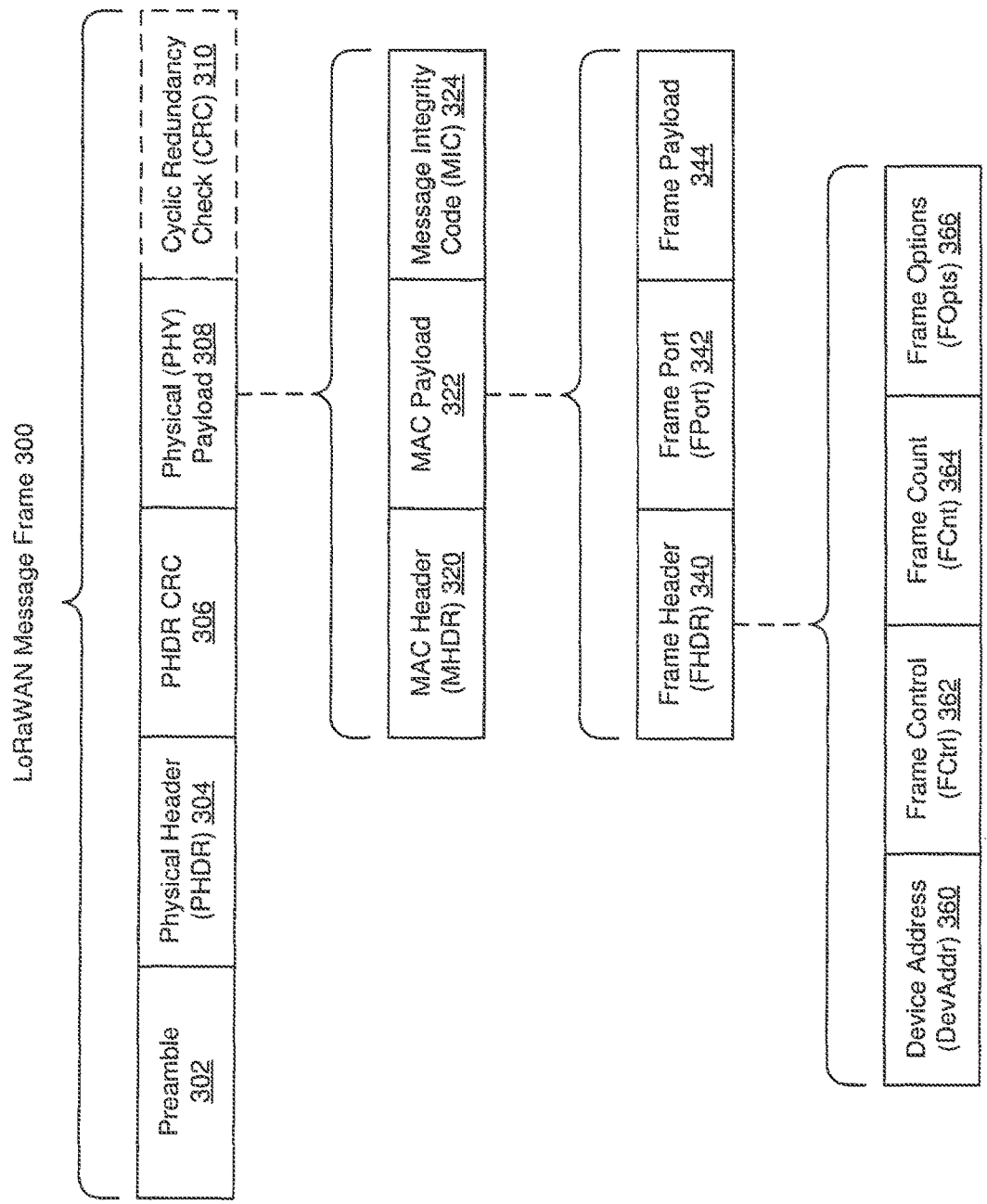
FIG. 3 shows a LoRaWAN message frame in accordance with one or more embodiments disclosed herein.

FIG. 3 shows a LoRaWAN message frame in accordance with one or more embodiments disclosed herein. The LoRaWAN message frame (300) includes a preamble (302), a physical header (PHDR) (304), a PHDR cyclic redundancy check (CRC) (306), and a physical (PHY) payload (308). These aforementioned components may be present within an uplink message frame, which may be transmitted by an end device to the network host. In one embodiment disclosed herein, when considering downlink message frames, which may be transmitted by the network host to an end device, the LoRaWAN message frame (300) may further include a CRC (310). Each of these components is described below.

In one or more embodiments disclosed herein, the preamble (302), PHDR (304), PHDR CRC (306), PHY payload (308), and CRC (310) may be generated by a LoRa® protocol stack physical layer. The physical layer may construct the LoRaWAN message frame (300) in order to transmit the PHY payload (308) over a radio frequency (RF) transmission. By way of an example, the physical layer may be the radio hardware (i.e., communication interface) on an end device or network host. In one or more embodiments disclosed herein, the integrities of the PHDR (304) and the PHY payload (308) are maintained by the PHDR CRC (306) and CRC (310), respectively.

In one or more embodiments disclosed herein, the PHY payload (308) may be a data structure that includes a media access control (MAC) header (MHDR) (320). The MHDR (320) may specify information that includes, but is not limited to, the message type of the LoRaWAN message frame (300) and the version of the message frame format of the LoRaWAN layer specification with which the LoRaWAN message frame (300) is encoded. The PHY payload (308) may further include a MAC payload (322) (described below) and a message integrity code (MIC) (324). In one or more embodiments disclosed herein, the MIC (324) may be a hexadecimal number calculated and verified over several components of the LoRaWAN message frame (300) (see e.g., FIGS. 4A and 4B) to ensure data integrity of the MAC payload (322).

In one or more embodiments disclosed herein, the MAC payload (322) may be a data structure that includes a frame header (FHDR) (340). The FHDR (340) may be further broken down, and thus, includes a device address (DevAddr) (360), a frame control (FCtrl) (362), a frame count (FCnt) (364), and frame options (FOpts) (366). The DevAddr (360) may be representative of the network address of an end device, which may be dynamically allocated by the network host during activation of the end device (see e.g., FIG. 5). The FCtrl (362) may contain information that includes, but is not limited to, the set data rate, transmission power, repetition rate, and frequency channel of the radio transceiver (i.e., communication interface). The FCnt (364) may track the number of uplink messages and downlink messages that have been exchanged. Further, the FOpts (366) may be used to transport MAC commands, which enable a network host to issue instructions to an end device. The issued instructions may, for example, instruct the end device to adjust one or more end device configuration parameter(s) (see e.g., FIG. 9).

In one or more embodiments disclosed herein, the MAC payload (322) may further include a frame port (FPort) (342) and a frame payload (344). The FPort (342) may indicate which session key (e.g., the network session key (NwkSKey) or the application session key (AppSKey)) to use for encrypting the frame payload (344). Lastly, the frame payload (344) may be representative of the content an end device or network host may be attempting to transmit to one another. One of ordinary skill in the art will now appreciate that a LoRaWAN message frame (300) may include other components without departing from the embodiments disclosed herein.

While FIG. 3 shows a configuration of components, message frame configurations other than that shown in FIG. 3, which pertains to the LoRaWAN specification, may be used without departing from the scope of the embodiments disclosed herein. For example, a message frame (e.g., a media access control (MAC) frame) abiding by the IEEE 802.15.4 standard may be employed instead.

Figure 4A:
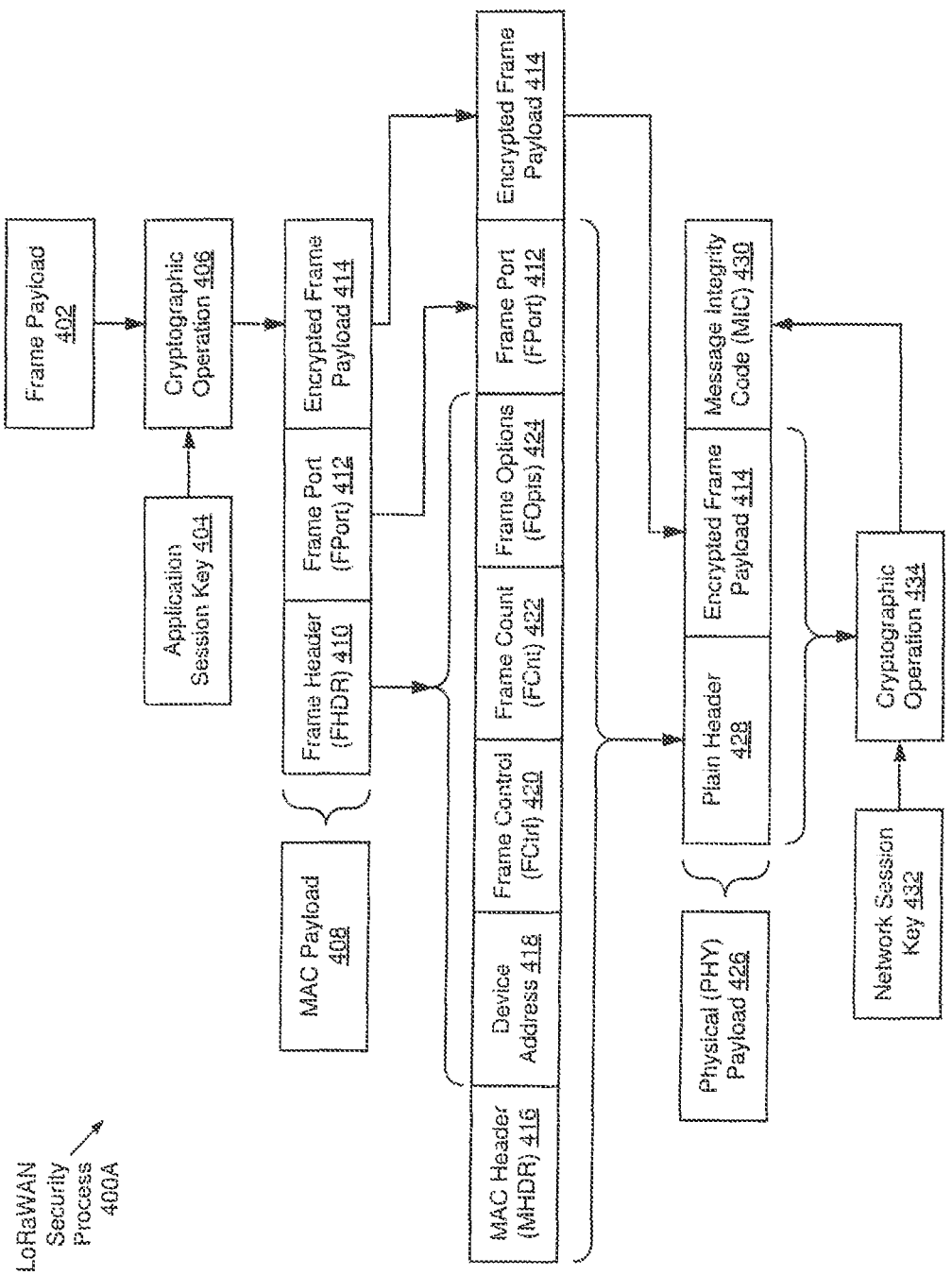
FIG. 4A shows a diagram illustrating a LoRaWAN security process in accordance with one or more embodiments disclosed herein.

FIG. 4A shows a diagram illustrating a LoRaWAN security process in accordance with one or more embodiments disclosed herein. The process (400A) may commence by obtaining a frame payload (402), which may be representative of the content that a source device may be attempting to transmit to a destination device. From here, an cryptographic operation (406) may be applied to the frame payload (402) using at least an application session key (AppSKey) (404). In one or more embodiments disclosed herein, the AppSKey (404) may be a unique hexadecimal number, specific to the end device, and known only to the end device and the application system. In one or more embodiments disclosed herein, the AppSKey may be used, by the end device and the application system, to encrypt and decrypt the frame payload (402). In one embodiment disclosed herein, the cryptographic operation (406) performed may entail an advanced encryption standard (AES) algorithm. In another embodiment disclosed herein, the cryptographic operation (406) may entail any other existing or future developed symmetric cipher. The result of the aforementioned cryptographic operation (406) may yield an encrypted frame payload (414).

In one or more embodiments disclosed herein, a symmetric cipher may be a cryptographic algorithm that uses the same cryptographic keys for both encrypting unencrypted information and decrypting encrypted information. In this disclosure, for example, the cryptographic key may be the header blinding key (HdrBKey), which may be used to both blind (or encrypt) a plain header (i.e., unencrypted information) and unblind (or decrypt) a blinded header (i.e., encrypted information). Besides the above-mentioned AES algorithm, examples of other symmetric ciphers that may be employed in one or more embodiments disclosed herein include, but are not limited to, the Twofish algorithm, the Serpent algorithm, the Blowfish algorithm, the CAST5 algorithm, the Kuznyechik algorithm, the Rivest Cipher (RC) 4 algorithm, the Triple Data Encryption Standard (3DES) algorithm, the Skipjack algorithm, and the International Data Encryption Algorithm (IDEA).

In one or more embodiments disclosed herein, the process (400A) may proceed through generation of a MAC payload (408). The MAC payload (408) may be attained by concatenating a frame header (FHDR) (410), a frame port (FPort) (412), and the encrypted frame payload (414). The FHDR (410) may include a device address (418), a frame control (FCtrl) (420), a frame count (FCnt) (422), and frame options (FOpts) (424). In one embodiment disclosed herein, the FHDR (410), along with a MAC header (MHDR) (416) and the FPort (412), may collectively be referred to as the plain header (428). In another embodiment disclosed herein, the plain header (428) may include at least the device address (418) and the FCnt (422). The term "plain", in one or more embodiments disclosed herein, may refer to exhibiting an exposed, unencrypted, or vulnerable state, which may be susceptible to eavesdropping or interception.

Proceeding with the process (400A), the plain header (428) may subsequently be appended with the encrypted frame payload (414) and a message integrity code (MIC) (430) to obtain a physical (PHY) payload (426). The MIC (430) may be generated by applying another cryptographic operation (434) to the plain header (428) and encrypted frame payload (414), collectively, using at least a network session key (NwkSKey) (432). In one or more embodiments disclosed herein, the NwkSKey (432) may be a unique hexadecimal number, specific to the end device, and known only to the end device and the network host. In one or more embodiments disclosed herein, the NwkSKey (432) may be used, by the end device and the network host, to calculate and verify the MIC (430) to ensure data integrity. In one embodiment disclosed herein, the cryptographic operation (434) performed may entail an AES algorithm. In another embodiment disclosed herein, the cryptographic operation (434) performed may entail any other existing or future developed symmetric cipher.

Figure 4B:
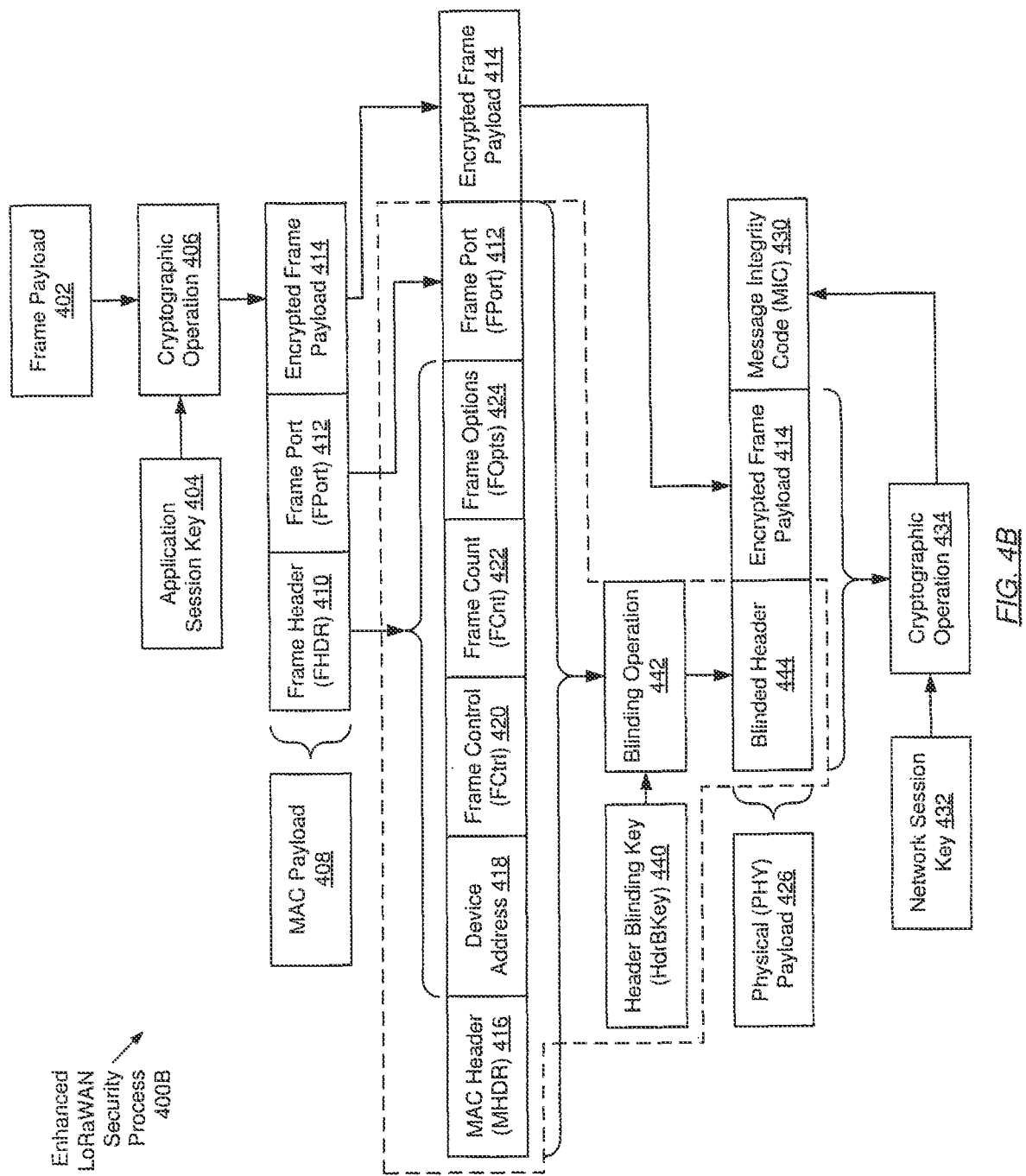
FIG. 4B shows a diagram illustrating an enhanced LoRaWAN security process in accordance with one or more embodiments disclosed herein.

FIG. 4B shows a diagram illustrating an enhanced LoRaWAN security process in accordance with one or more embodiments disclosed herein. The enhanced process (400B) is substantially similar to the process (400A) portrayed in FIG. 4A with the exception of a blinding operation (442). In one or more embodiments disclosed herein, the introduction of the blinding operation (442) may minimize, if not eliminate, the potential for eavesdropping or interception of the header information posed within a LoRaWAN message frame. Further, the blinding operation (442) may be applied to the plain header (428) using at least a header blinding key (HdrBKey) (440). As mentioned above, the plain header (428) may refer to an unencrypted header (including the MHDR (416), device address (DevAddr) (418), FCtrl (420), FCnt (422), FOpts (424), and FPort (412)), which may be susceptible to eavesdropping or interception. In one or more embodiments disclosed herein, the enhanced process (400B) addresses this vulnerability by yielding a blinded (or otherwise encrypted) header (444). In one or more embodiments disclosed herein, the HdrBKey (440) may be a unique hexadecimal number, specific to the end device, and known only to the end device and the network host. In one or more embodiments disclosed herein, the HdrBKey (440) may be used, by the end device and the network host, to blind/encrypt a plain header and unblind/decrypt a blinded header. In one embodiment disclosed herein, the blinding operation (442) performed may entail an AES algorithm. In another embodiment disclosed herein, the blinding operation (442) performed may entail any other existing or future developed symmetric cipher.

FIGS. 5-9 show flowcharts in accordance with one or more embodiments disclosed herein. While the various steps in the flowcharts are presented and described sequentially, one of ordinary skill will appreciate that some or all of the steps may be executed in different orders, may be combined or omitted, and some or all steps may be executed in parallel. In one embodiment disclosed herein, the steps shown in FIGS. 5-9 may be performed in parallel with any other steps shown in FIGS. 5-9 without departing from the scope of the embodiments disclosed herein.

Figure 5A:
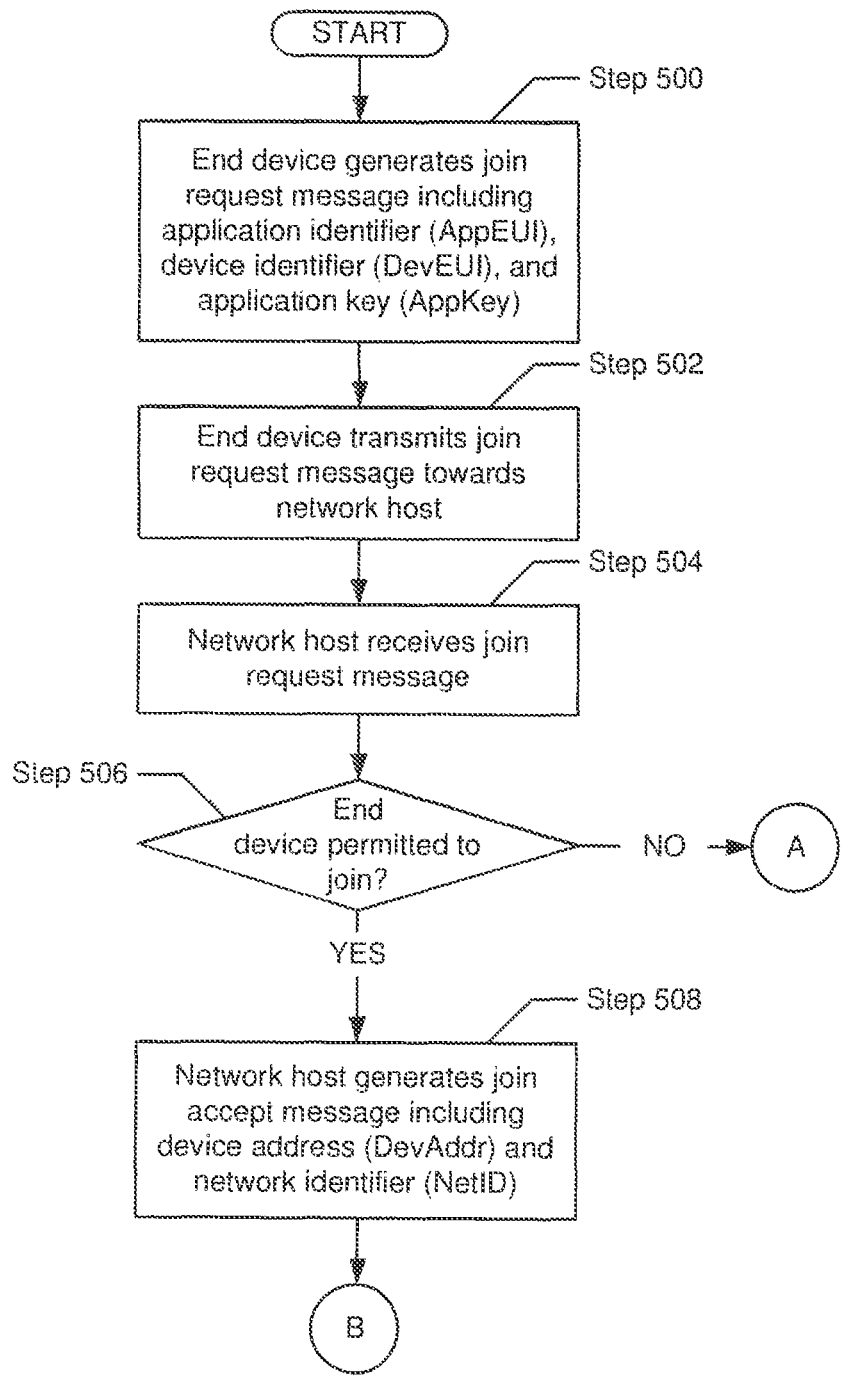
FIGS. 5A and 5B show a flowchart describing a method for activating an end device in accordance with one or more embodiments disclosed herein.
Figure 5B:
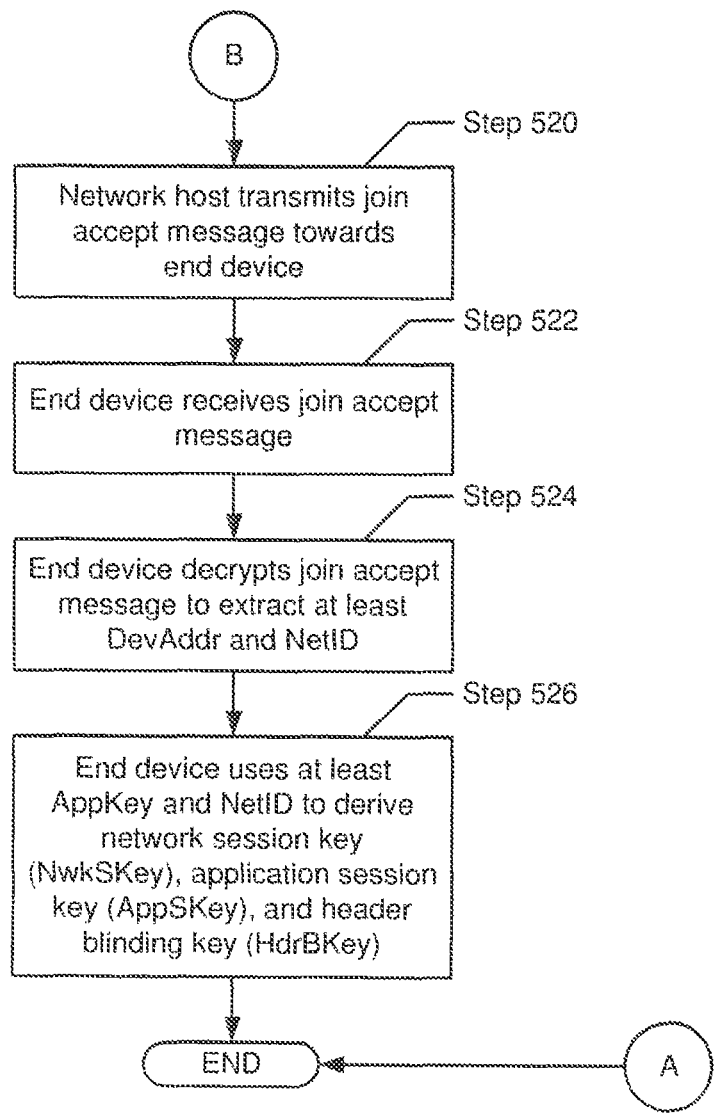

FIGS. 5A and 5B show flowcharts describing a method for activating an end device in accordance with one or more embodiments disclosed herein. Specifically, FIGS. 5A and 5B describe the method of over the air activation (OTAA). OTAA may be one way which enables an end device to join a network and participate in secure information exchanges with the network host. Further, the below described OTAA procedure may be performed when an end device is initially deployed or every time an end device resets.

In Step 500, an end device generates a join request message. In one or more embodiments disclosed herein, a join request message may be a LoRaWAN message frame (see e.g., FIG. 3) that includes a unique identifier as the media access control (MAC) header (MHDR), thereby affiliating the LoRaWAN message frame with a join request message type. In one or more embodiments disclosed herein, the join request message may further include an application identifier (AppEUI), a device identifier (DevEUI), and an application key (AppKey). The AppEUI may be a globally unique hexadecimal number that uniquely identifies a specific application system (i.e., the application system that owns or controls the end device). Further, the DevEUI may be a globally unique hexadecimal number that uniquely identifies a specific end device (i.e., the end device generating the join request message). Moreover, the AppKey may be a unique hexadecimal number that may be specific to the end device. The AppKey may be used, by the end device, to derive session keys and a blinding key (see e.g., Step 526), which are necessary to enable the end device to participate in secure information exchanges with the network host. The AppKey may be pre-provisioned to (or stored on) the end device during the manufacturing process. In one or more embodiments disclosed herein, the AppEUI, DevEUI, and AppKey may be pre-provisioned to (or stored on) the end device during the manufacturing process. One of ordinary skill in the art would appreciate that the join request message may include additional components without departing from the scope of the embodiments disclosed herein.

In Step 502, the end device transmits the join request message (generated in Step 500) towards the network host. In Step 504, the network host receives the join request message (transmitted by the end device in Step 502). Specifically, in one or more embodiments disclosed herein, the network host may receive a MAC frame encapsulating the join request message. The received MAC frame may have been generated by a network gateway upon receiving the join request message from the end device. The network host may subsequently decapsulate the MAC frame to access the various components (e.g., AppEUI, DevEUI, and AppKey) of the join request message.

In Step 506, the network host makes a determination as to whether the end device is permitted to join or participate in the network. In one or more embodiments disclosed herein, the determination may entail authenticating the join request message, or more specifically, the message integrity code (MIC) (see e.g., FIG. 3) of the join request message using at least the AppEUI, the DevEUI, and the AppKey. If the end device is permitted to join or participate in the network (i.e., authentication of the MIC succeeds), then the process proceeds to Step 508. On the other hand, if the end device is not permitted to join or participate in the network (e.g., authentication of the MIC fails), then the process ends.

In Step 508, in determining that the end device is permitted to join or participate in the network, the network host generates a join accept message. In one or more embodiments disclosed herein, a join accept message may be a LoRaWAN message frame (see e.g., FIG. 3) that includes a unique identifier as the MHDR, thereby affiliating the LoRaWAN message frame as a join accept type. In one or more embodiments disclosed herein, the join accept message may further include a device address (DevAddr) and a network identifier (NetID). The DevAdrr may be a unique hexadecimal number that uniquely identifies the network address for the end device in the network. The DevAddr may be dynamically allocated, by the network host, in response to receiving and authenticating the join request message. Further, the NetID may be a globally unique hexadecimal number that uniquely identifies a specific network (i.e., the network in which at least the network host resides). One of ordinary skill in the art will now appreciate that the join accept message may include additional components without departing from the scope of the embodiments disclosed herein.

Turning to FIG. 5B, in Step 520, the network host transmits the join accept message towards the end device. Specifically, in one or more embodiments disclosed herein, after generating the join accept message, the network host may encrypt the join accept message using the AppKey in conjunction with, for example, an advanced encryption standard (AES) encryption algorithm. Alternatively, the network host may encrypt the join accept message using the AppKey in conjuction with any other existing or future developed symmetric cipher. Subsequently, the network host may encapsulate the encrypted join accept message within a MAC frame, wherein the MAC frame is transmitted towards the end device. In one or more embodiments disclosed herein, upon arriving at a network gateway, which may be a single-hop away from the end device, the network gateway may decapsulate the MAC frame before transmitting the encrypted join accept message to the end device.

In Step 522, the end device receives the join accept message (transmitted by the network host in Step 520). As mentioned above, in one or more embodiments disclosed herein, the received join accept message may be encrypted. In Step 524, the end device subsequently decrypts the join accept message (received in Step 522). In one or more embodiments disclosed herein, the end device may decrypt the join accept message, using the AppKey, to access the various components (e.g., DevAddr and NetID) of the join accept message.

In Step 526, the end device derives a network session key (NwkSKey), an application session key (AppSKey), and a header blinding key (HdrBKey). In one or more embodiments disclosed herein, each of the aforementioned keys may be derived using at least the AppKey and the NetID. One of ordinary skill in the art will now appreciate that additional or alternative components may be used by the end device to derive the aforementioned keys. The NwkSKey may be a unique hexadecimal number, specific to the end device, and known only to the end device and the network host. In one or more embodiments disclosed herein, the NwkSKey may be used, by the end device and the network host, to calculate and verify the MIC of all LoRaWAN message frames to ensure data integrity (see e.g., FIGS. 3, 4A, and 4B). Further, the AppSKey may be a unique hexadecimal number, specific to the end device, and known only to the end device and the application system. In one or more embodiments disclosed herein, the AppSKey may be used, by the end device and the application system, to encrypt and decrypt the frame payload (see e.g., FIGS. 3, 4A, and 4B) of a LoRaWAN message frame. Moreover, the HdrBKey may be a unique hexadecimal number, specific to the end device, and known only to the end device and the network host. In one or more embodiments disclosed herein, the HdrBKey may be used, by the end device and the network host, to blind/encrypt a plain header and unblind/decrypt a blinded header (see e.g., FIGS. 4B, and 6A-7B) of a LoRaWAN message frame.

While FIGS. 5A and 5B describe one method for activating an end device, activation methods other than that shown in FIGS. 5A and 5B may be used without departing from the scope of the embodiments disclosed herein. For example, the method of activation by personalization (ABP) may be utilized. In ABP, rather than performing the procedure described above, the DevAddr, NwkSKey, AppSKey, and HdrBKey are pre-provisioned to (or hardcoded on) the end device during the manufacturing process. In one or more embodiments of the devices, systems, and methods described herein, a single portion may be hardcoded. For example, in one or more embodiments, the DevAddr may be provided to the end device during manufacturing. In another embodiment, the NwkSKey may be provided to the end device during manufacturing. In another embodiment, the AppSKey may be provided to the end device during manufacturing. In another embodiment, the HdrBKey may be provided to the end device during manufacturing. Subsequently, with these pre-provisioned components, the end device, when deployed or reset, may immediately begin participating in the secured exchange of information with the network host.

Figure 6A:
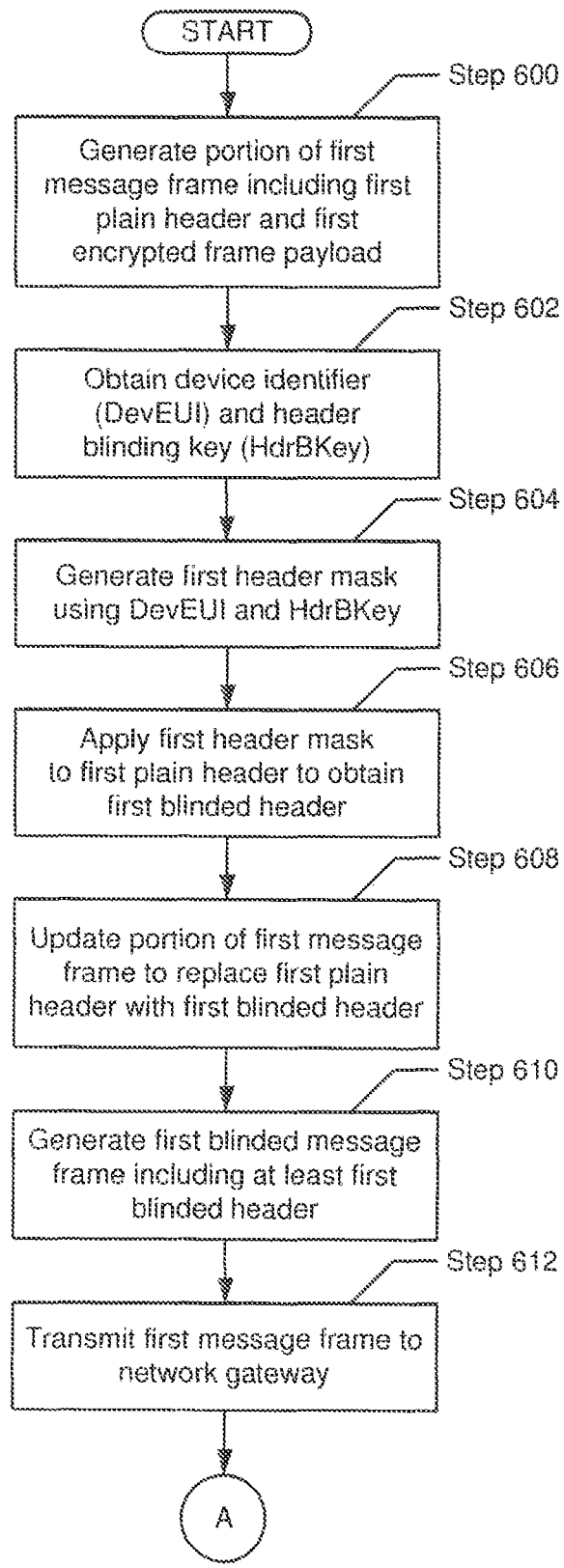
FIGS. 6A and 6B show flowcharts describing a method for blinding a plain header in accordance with one or more embodiments disclosed herein.
Figure 6B:
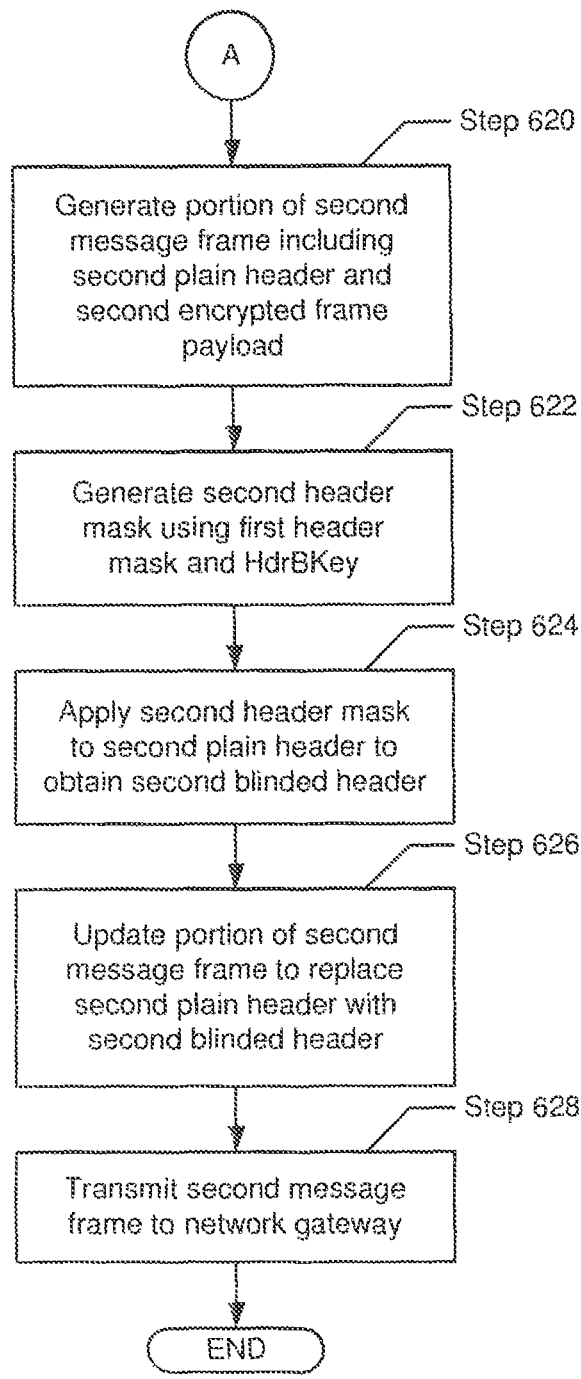

FIGS. 6A and 6B show flowcharts describing a method for blinding a plain header in accordance with one or more embodiments disclosed herein. Specifically, FIG. 6A describes a method for blinding the plain header of any first LoRaWAN message frame exchanged between an end device and the network host. FIG. 6B describes a method for blinding the plain header of any subsequent (i.e., second or later) LoRaWAN message frame exchanged between the end device and the network host.

Turning to FIG. 6A, in Step 600, a portion of a first LoRaWAN message frame is generated. In one or more embodiments disclosed herein, the portion may include a first plain header and a first encrypted frame payload. As described above with respect to FIG. 3, a plain header may include the following components: a MAC header (MHDR), a device address (DevAddr), a frame control (FCtrl), a frame count (FCnt), frame options (FOpts), and a frame port (FPort). In one or more embodiments disclosed herein, the first plain header and the first encrypted frame payload may collectively represent a portion of the physical (PHY) payload of the first LoRaWAN message frame. In one embodiment disclosed herein, Step 600 may be performed by an end device, wherein the first LoRaWAN message frame may be an uplink message. In another embodiment disclosed herein, Step 600 may be performed by the network host, wherein the first LoRaWAN message frame may be a downlink message.

In Step 602, a device identifier (DevEUI) and a header blinding key (HdrBKey) is obtained. In one or more embodiments disclosed herein, the DevEUI and the HdrBKey may be retrieved from local storage or memory residing on the end device or network host. Further, in one embodiment disclosed herein, the DevEUI and HdrBKey may be locally stored on the end device or network host through pre-provisioning (i.e., by way of activation by personalization (ABP)) (discussed above). In another embodiment disclosed herein, the DevEUI and HdrBKey may be locally stored on the end device or network host after performing the method described above with respect to FIGS. 5A and 5B.

In Step 604, a first header mask is generated. In one or more embodiments disclosed herein, the first header mask may be generated by performing a cryptographic operation on the DevEUI using the HdrBKey. Further, the cryptographic operation may entail any existing or future developed symmetric cipher. By way of an example, in one embodiment disclosed herein, the cryptographic operation may employ an AES encryption algorithm.

In Step 606, the first header mask (generated in Step 604) is applied to the first plain header. In one or more embodiments disclosed herein, applying the first header mask to the first plain header may entail performing a bitwise exclusive OR (i.e., XOR) operation involving the first header mask and the first plain header. In one or more embodiments disclosed herein, a first blinded header may result from the aforementioned bitwise XOR operation.

In Step 608, the portion of the first LoRaWAN message frame (generated in Step 600) is updated. In one or more embodiments disclosed herein, the update may entail replacing the first plain header with the first blinded header (obtained in Step 606). In Step 610, the remainder of the first LoRaWAN message frame may be generated in accordance with the LoRaWAN specification to yield a first blinded LoRaWAN message frame. In one or more embodiments disclosed herein, the first blinded LoRaWAN message frame includes at least the first blinded header (obtained in Step 608). In Step 612, the first blinded LoRaWAN message frame (generated in Step 610) is subsequently transmitted. In one or more embodiments disclosed herein, whether the transmitting entity is an end device or the network host, the first blinded LoRaWAN message frame may be transmitted to a network gateway.

Turning to FIG. 6B, in Step 620, a portion of a second (or subsequent) LoRaWAN message frame is generated. In one or more embodiments disclosed herein, the portion of the second (or subsequent) LoRaWAN message frame may include a second (or subsequent) plain header and a second (or subsequent) encrypted frame payload.

In Step 622, a second (or subsequent) header mask is generated. In one or more embodiments disclosed herein, the second (or subsequent) header mask may be generated by performing a cryptographic operation on the first (or previously generated) header mask using the HdrBKey. Further, the cryptographic operation may entail any existing or future developed symmetric cipher. By way of an example, in one embodiment disclosed herein, the cryptographic operation may employ an AES encryption algorithm.

In Step 624, the second (or subsequent) header mask (generated in Step 622) is applied to the second (or subsequent) plain header. In one or more embodiments disclosed herein, applying the second (or subsequent) header mask to the second (or subsequent) plain header may entail performing a bitwise exclusive OR (i.e., XOR) operation involving the second (or subsequent) header mask and the second (or subsequent) plain header. In one or more embodiments disclosed herein, a second (or subsequent) blinded header may result from the aforementioned bitwise XOR operation.

In Step 626, the portion of the second (or subsequent) LoRaWAN message frame (generated in Step 620) is updated. In one or more embodiments disclosed herein, the update may entail replacing the second (or subsequent) plain header with the second (or subsequent) blinded header (obtained in Step 624). From here, the remainder of the second (or subsequent) LoRaWAN message frame may be generated in accordance with the LoRaWAN specification. The result is the attaining of a second (or subsequent) blinded LoRaWAN message frame. In Step 628, the second (or subsequent) blinded LoRaWAN message frame is subsequently transmitted. In one or more embodiments disclosed herein, whether the transmitting entity is an end device or the network host, the second (or subsequent) blinded LoRaWAN message frame may be transmitted to a network gateway.

Figure 7A:
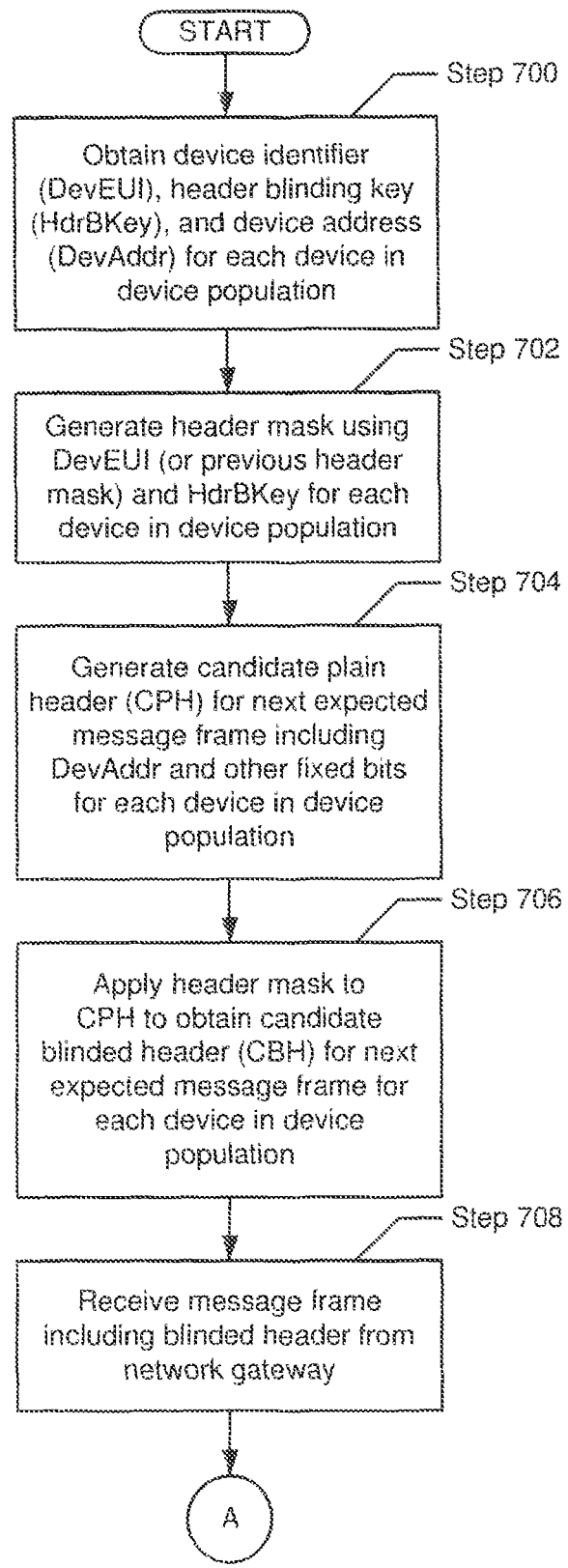
FIGS. 7A and 7B show flowcharts describing a method for unblinding a blinded header in accordance with one or more embodiments disclosed herein.
Figure 7B:
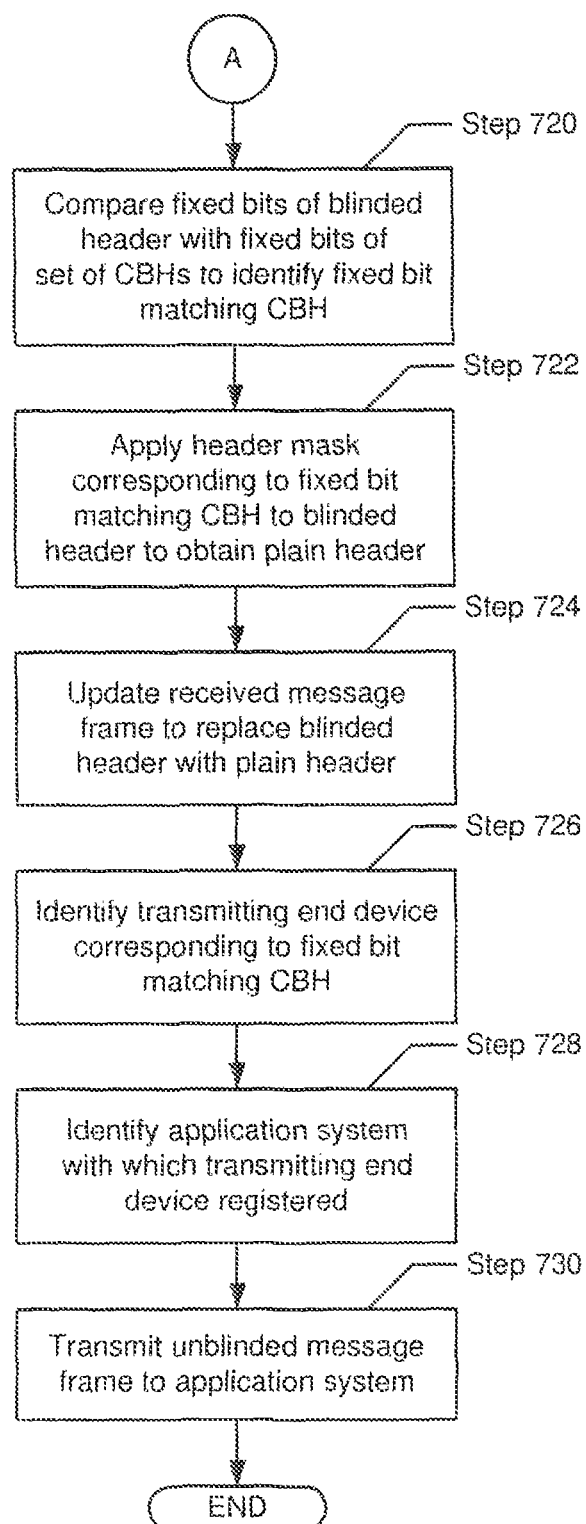

FIGS. 7A and 7B show flowcharts describing a method for unblinding a blinded header in accordance with one or more embodiments disclosed herein. In one embodiment disclosed herein, the following unblinding method may be performed exclusively by the network host. In another embodiment disclosed herein, the following unblinding method (or more precisely, Step 700 to Step 724) may additionally be performed on an end device. In the latter embodiment, the terminology referencing "for each end device in the device population" (to be introduced below in view of the method being performed by the network host) may be substituted to reflect terminology referencing "for the end device" (i.e., the end device performing the unblinding method).

In Step 700, for each end device in a device population, a device identifier (DevEUI), a header blinding key (HdrBKey), and a device address (DevAddr) are obtained. In one or more embodiments disclosed herein, a device population may refer to the set of end devices to which the network host is operatively (or communicatively) connected. In reference to FIG. 1B, the device population managed by the network host (106) may include end devices A-C (102A-102C), J-L (102J-102L), and S-U (102S-102U). Moreover, as mentioned above, the DevEUI, the HdrBKey, and the DevAddr are each specific to an end device. Therefore, in one or more embodiments disclosed herein, for the device population, a set of unique DevEUIs, a set of unique HdrBKeys, and a set of DevAddrs may be obtained. Further, in one or more embodiments disclosed herein, the set of DevEUIs, the set of HdrBKeys, and the set of DevAddrs may be retrieved from local storage or memory residing on the network host. In one embodiment disclosed herein, the aforementioned sets of information may be locally stored on the network host through pre-provisioning (i.e., by way of activation by personalization (ABP)) (discussed above). In another embodiment disclosed herein, the aforementioned sets of information may be locally stored on the network host after performing the method described above with respect to FIGS. 5A and 5B.

In Step 702, for each end device in the device population, a header mask is generated, thereby obtaining a set of header masks. In one embodiment disclosed herein, when expecting a first LoRaWAN message frame, a first header mask may be generated by performing a cryptographic operation on the DevEUI using the HdrBKey. In other embodiments disclosed herein, when expecting a second (or subsequent) LoRaWAN message frame, a second (or subsequent) header mask may be generated by performing a cryptographic operation on the first (or previously generated) header mask using the HdrBKey. Further, the cryptographic operation may entail any existing or future developed symmetric cipher. By way of an example, in one embodiment disclosed herein, the cryptographic operation may employ an AES encryption algorithm.

In Step 704, for each end device in the device population, a candidate plain header (CPH) for a next expected LoRaWAN message frame is generated, thereby obtaining a set of CPHs. In one or more embodiments disclosed herein, generation of the CPH may entail instantiating (or initializing) a random hexadecimal number, where the length of the random hexadecimal number equals the length of a plain header. Subsequently, at the known bit locations of a plain header designated for the DevAddr (see e.g., FIGS. 3, 4A, and 4B) and other fixed data, the DevAddr and other fixed data may be substituted into those corresponding bit locations on the random hexadecimal number. The aforementioned substitution results in a CPH, which may include a portion of significant bits (portrayed by the DevAddr and other fixed data at their designated bit locations) and a portion of insignificant (or do not care) bits.

In Step 706, for each end device in the device population, the header mask is applied to the CPH for the next expected LoRaWAN message frame. Accordingly, as a result, a candidate blinded header (CBH) is attained for each end device in the device population, thereby obtaining a set of CBHs. In one or more embodiments disclosed herein, applying the header mask to the CPH may entail performing a bitwise exclusive OR (i.e., XOR) operation involving the header mask and the CPH.

In Step 708, a LoRaWAN message frame is received. In one or more embodiments disclosed herein, the received LoRaWAN message frame may include a blinded header (i.e., an encrypted plain header) (see e.g., FIG. 4B). Further, the received LoRaWAN message frame may have been transmitted by a network gateway. In one embodiment disclosed herein, when considering that the network host is performing the unblinding method, the received LoRaWAN message frame may arrive as a media access control (MAC) frame, which encapsulates the LoRaWAN message frame. In another embodiment disclosed herein, when considering that an end device is performing the unblinding method, the received LoRaWAN message frame may arrive as itself (i.e., without MAC encapsulation).

Turning to FIG. 7B, in Step 720, the fixed (or significant) bits of the blinded header (of the LoRaWAN message frame received in Step 708) is compared with the fixed (or significant) bits of each CBH of the set of CBHs (obtained in Step 706). In one or more embodiments disclosed herein, based on the comparisons, at least one fixed-bit-matching CBH is identified. In one or more embodiments disclosed herein, a fixed-bit-matching CBH refers to a CBH, of the set of CBHs, that includes fixed (or significant) bits that exactly match the fixed (or significant) bits included in the aforementioned blinded header. Though the possibility of identifying multiple fixed-bit-matching CBHs exists, the probability is considered infinitesimally low. Subsequently, in all likelihood, only a single fixed-bit-matching CBH may be identified as a result of the aforementioned comparisons.

In Step 722, an identified header mask is applied to the blinded header (of the LoRaWAN message frame received in Step 708). In one or more embodiments disclosed herein, the identified header mask may be the one header mask, of the set of header masks (generated in Step 702) that corresponds to the fixed-bit-matching CBH (identified in Step 720). As discussed above with respect to Step 706, a CBH (for a specific end device) may be obtained by applying a header mask (for the specific end device) to a CPH for the next expected LoRaWAN message frame (for the specific end device). Thus, in one or more embodiments disclosed herein, the identified header mask may be the header mask (for a specific end device) that was applied to the CPH (for the specific end device) to attain the fixed-bit-matching CBH (associated with the specific end device). Moreover, in one or more embodiments disclosed herein, in applying the identified header mask to the blinded header, a plain (i.e., decrypted/unencrypted) header is obtained. In one or more embodiments disclosed herein, applying the identified header mask to the blinded header, resulting in the plain header, may entail performing a bitwise exclusive OR (i.e., XOR) operation involving the identified header mask and the blinded header.

In Step 724, the LoRaWAN message frame (received in Step 708) is updated using the plain header (obtained in Step 722). Specifically, in one or more embodiments disclosed herein, the blinded header residing in the received LoRaWAN message frame may be replaced with the plain header (obtained in Step 722). The result is the attaining of an unblinded LoRaWAN message frame.

In Step 726, a transmitting end device (of the device population) corresponding to the fixed-bit-matching CBH is identified. In one or more embodiments disclosed herein, because a header mask, CPH, and CBH are end device specific (discussed above), one or more of aforementioned information may be traced back to the transmitting end device. In one embodiment disclosed herein, associations between an end device and the aforementioned information may be tracked or consolidated locally on the network host. In such an embodiment, identification of the transmitting end device may entail finding a locally stored record or entry that includes the fixed-bit-matching CBH. In identifying a particular record or entry, the transmitting end device may be found to be associated with the particular record or entry.

In Step 728, the application system with which the transmitting end device (identified in Step 726) is registered is identified. In one or more embodiments disclosed herein, the network host may include functionality to track or consolidate associations detailing which set of end devices may be owned/controlled by which application system. Subsequently, using these associations, the applications system that owns or controls the transmitting end device (identified in Step 726) may be identified. In Step 730, the unblinded LoRaWAN message frame (attained in Step 724) is transmitted to the application system (identified in Step 728). In one or more embodiments disclosed herein, as the backhaul network, wherein the network host and application system reside, may employ TCP/IP, the unblinded LoRaWAN message frame may be encapsulated in a MAC frame before transmission.

Figure 8:
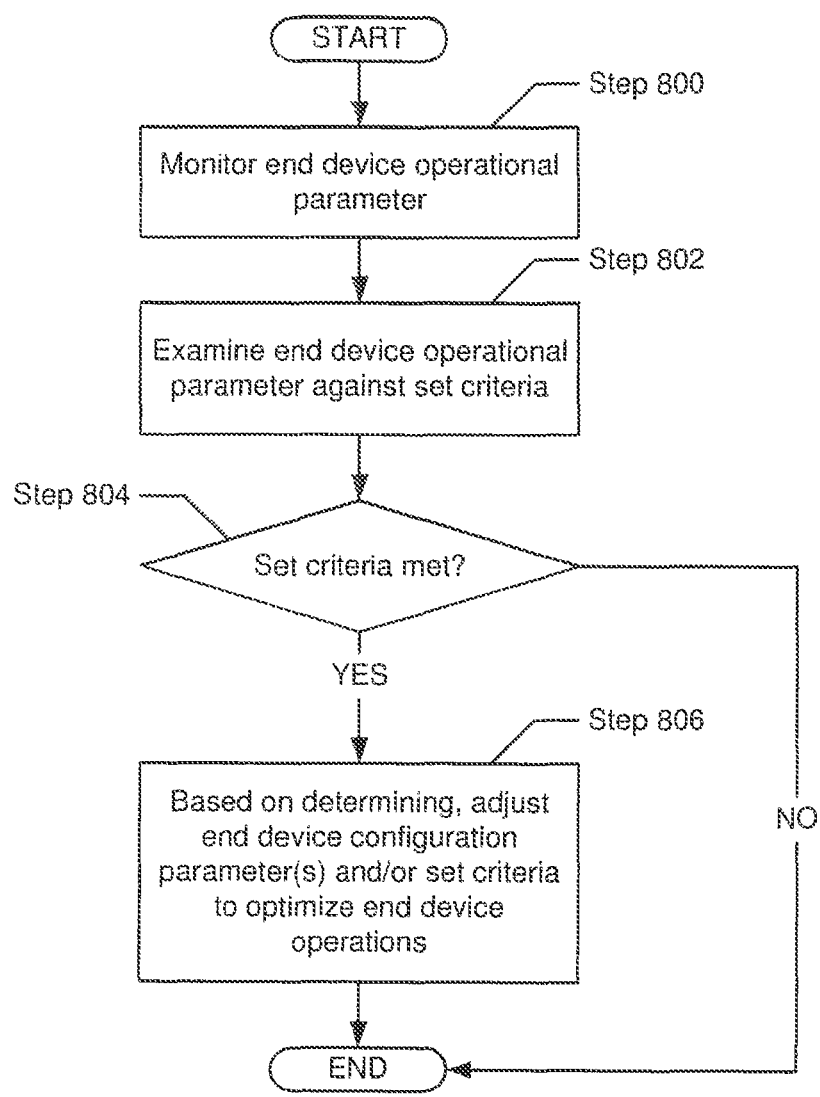
FIG. 8 shows a flowchart describing a method for optimizing end device operations in accordance with one or more embodiments disclosed herein.

FIG. 8 shows a flowchart describing a method for optimizing end device operational management in accordance with one or more embodiments disclosed herein. In one or more embodiments disclosed herein, the following method may be exclusively performed by an end device.

In Step 800, one or more end device operational parameter(s) are monitored. In one embodiment disclosed herein, an end device operational parameter may be any observable physical property, measurable physical property, or combinations thereof. In such an embodiment, the one or more of the above described properties may be gauged by one or more sensor(s) residing on (or operatively connected to) the end device. Examples of an end device operational parameter as an observable and measurable physical property include, but are not limited to, electrical characteristics (e.g., electric charge, capacitance, electrical field, electrical impedance, power, magnetic fluxes), temperature, location, radioactive qualities, intensity, frequency, pressure, and velocity. In another embodiment disclosed herein, an end device operational parameter may be a metric derived from one or more observable/measurable physical properties. A metric may depict qualitative information such as, for example, thresholds, constraints, scopes, durations, maximums, minimums, and averages. Examples of an end device operational parameter as a metric include, but are not limited to, data rates, processor usage, hardware temperature, sensor tolerances, latency, message frame loss, incident response, and vulnerability mitigation.

In Step 802, the one or more end device operational parameter(s) (monitored in Step 800) are examined against set criteria. In one embodiment disclosed herein, the set criteria may include static conditions or standards, which may have been provided during the manufacturing process. In another embodiment disclosed herein, the set criteria may include dynamic conditions or standards, which may change with, for example, software/firmware updates, configuration update messages (see e.g., FIG. 9), and self-improvement/learning schemes. By way of an example, a dynamic set criterion for the observable/measurable physical property of location (as an end device operational parameter) may be the constraint provided by a geofence (i.e., a virtual geographic boundary that may trigger a response when the end device enters or leaves a particular area, or is within or beyond a specified range from a reference). By way of another example, a static set criterion for the metric of lifetime energy throughput of the power source (as an end device operational parameter) may be a preset hard ceiling or maximum specifying a total amount of energy (in Watt-hours) which can be charged into and drained from the power source over all the cycles in its lifetime. In one or more embodiments disclosed herein, the set criteria may align with a global end device objective such as, for example, energy conservation, message frame transmission success, sustained privacy and security, and other performance related goals.

In Step 804, a determination is made as to whether the set criteria (against which the one or more end device operational parameter(s) were examined) are met. If the set criteria are met, the process proceeds to Step 806. On the other hand, if the set criteria are not met, the process ends.

In Step 806, in determining (in Step 804) that the set criteria are met by the one or more end device operational parameter(s), one or more end device configuration parameter(s) are adjusted. In one or more embodiments disclosed herein, an end device configuration parameter may be a control variable that may affect the operation of the end device. Further, in one or more embodiments disclosed herein, the one or more configuration parameter(s) may be adjusted to maintain end device operations in alignment with a global end device objective (mentioned above). Examples of an end device configuration parameter include, but are not limited to, radio frequency channel and data rate (which may affect communication range, message duration, and battery life). In one or more other embodiments disclosed herein, in response to the determination (of Step 804), one or more dynamic set criteria may be adjusted. The aforementioned adjustments to configuration parameter(s) or set criteria may be directed to optimizing end device operations.

Figure 9:
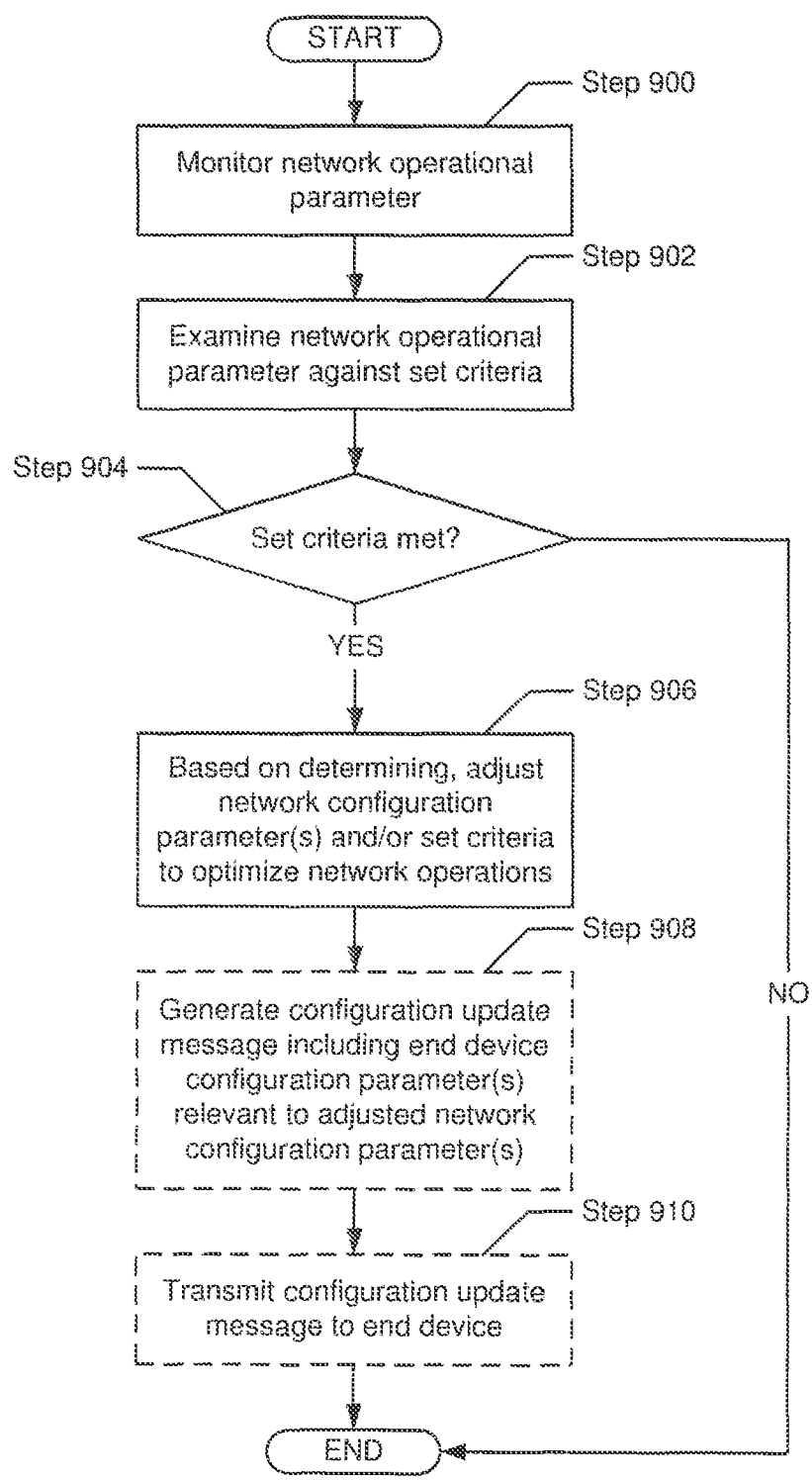
FIG. 9 shows a flowchart describing a method for optimizing network operations in accordance with one or more embodiments disclosed herein.

FIG. 9 shows a flowchart describing a method for optimizing network operational management in accordance with one or more embodiments disclosed herein. In one or more embodiments disclosed herein, the following method may be exclusively performed by the network host.

In Step 900, one or more network operational parameter(s) are monitored. In one embodiment disclosed herein, a network operational parameter may be any performance metric derived from one or more observable/measurable physical properties (described above). A metric may depict qualitative information such as, for example, thresholds, constraints, scopes, durations, maximums, minimums, and averages. Examples of a network operational parameter as a performance metric include, but are not limited to, bandwidth availability, traffic levels, packet loss, relative link loading, latency, throughput, end-to-end delay, jitter, and other existing network performance measurements/metrics.

In Step 902, the one or more network operational parameter(s) (monitored in Step 900) are examined against set criteria. In one embodiment disclosed herein, the set criteria may include static conditions or standards, which may have been provided during the initial deployment of the network. In another embodiment disclosed herein, the set criteria may include dynamic conditions or standards, which may change with, for example, software/firmware updates, and self-improvement/learning schemes. In one or more embodiments disclosed herein, the set criteria may align with a global network objective such as, for example, maximizing uptime and throughput, minimizing latency and error rate, and other network performance related goals.

In Step 904, a determination is made as to whether the set criteria (against which the one or more network operational parameter(s) were examined) are met. If the set criteria are met, the process proceeds to Step 906. On the other hand, if the set criteria are not met, the process ends.

In Step 906, in determining (in Step 904) that the set criteria are met by the one or more network operational parameter(s), one or more network configuration parameter(s) are adjusted. In one or more embodiments disclosed herein, a network configuration parameter may be a control variable that may affect the operation of the network. Further, in one or more embodiments disclosed herein, the one or more network configuration parameter(s) may be adjusted to maintain network operations in alignment with a global network objective (mentioned above). In one or more other embodiments disclosed herein, in response to the determination (of Step 904), one or more dynamic set criteria may be adjusted. The aforementioned adjustments to network configuration parameter(s) or set criteria may be directed to optimizing network operations.

In Step 908, adjustments to network configuration parameter(s) or set criteria may translate to instructions/commands with which end devices may be required to comply. For example, a network host may adjust a certain set of network configuration parameter(s) or set criteria to place a cap on the amount of load the network may experience at any given time. In one embodiment disclosed herein, the adjustments may be performed to prevent overloading the capacity of the network, which may lead to data collisions and frame losses. Subsequently, the network host, in applying these countermeasures, may formulate instructions by which end devices are required to abide in order to maintain the load on the network within tolerances. In this example, the instructions may include commanding end devices to adjust their data rate, transmission power, repetition rate, radio frequency channel, or combinations thereof.

In proceeding with Step 908, one or more configuration update message(s) are generated. In one or more embodiments disclosed herein, a configuration update message may be at least a portion of a set of instructions or computer readable program code, which may be executed by an end device. In one embodiment disclosed herein, the configuration update message(s) may target a subset of the device population (i.e., the set of end devices operatively (or communicatively) connected to the network host). In another embodiment disclosed herein, the configuration update message(s) may target the entire device population. Further, in one embodiment disclosed herein, the configuration update message(s) may each include the same global instructions. In another embodiment disclosed herein, the configuration update message(s) may each include unique instructions specific to the end device the configuration update message(s) is targeting. Moreover, in one or more embodiments disclosed herein, the configuration update message may include identifier(s) for one or more end device configuration parameter(s) along with one or more corresponding set value(s) associated with the end device configuration parameter(s).

In Step 910, the configuration update message(s) (generated in Step 908) are transmitted towards one or more end device(s). In one embodiment disclosed herein, the configuration update message(s) may be transmitted towards the necessary one or more end device(s) to effect the optimization of network operations. The network host may include functionality to determine which end devices to target based on being able to track or consolidate the current states of each end device in the device population.

Figure 10A:
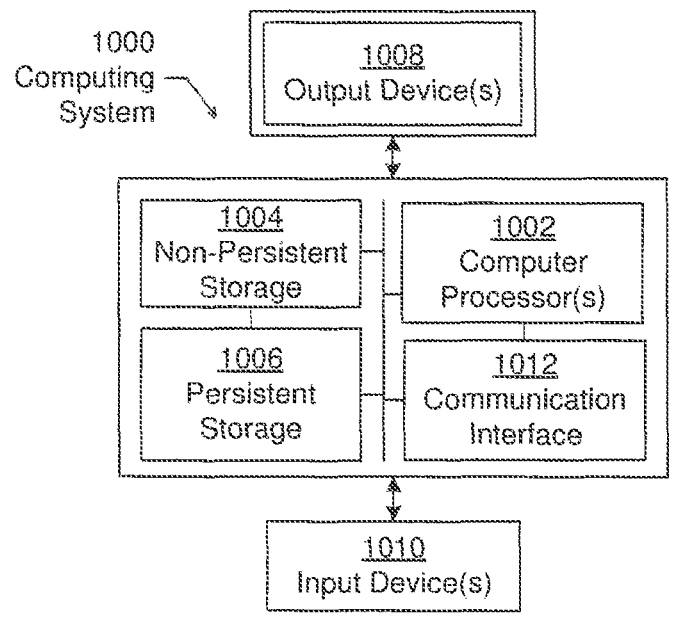
FIGS. 10A and 10B each show a computing system in accordance with one or more embodiments disclosed herein.

Embodiments of the disclosure may be implemented on a computing system. Any combination of mobile, desktop, server, router, switch, embedded device, or other types of hardware may be used. For example, as shown in FIG. 10A, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system 4) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 10B:
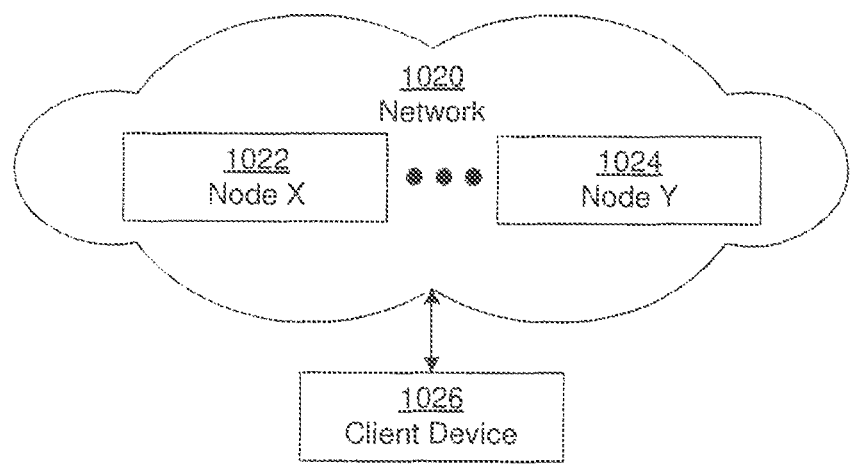

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1000) may be located at a remote location and connected to the other elements over a network.

Although not shown in FIG. 10B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10A. Further, the client device (1026) may include or perform all or a portion of one or more embodiments of the disclosure.

The computing system or group of computing systems described in FIGS. 10A and 10B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 10A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic or bitwise logical operations on the two data values). The ALU outputs the numerical result of the operation or one or more status flags related to the numerical result. For example, the status flags may indicate whether the numerical result is a positive number, a negative number, zero, etc. By selecting the proper opcode and then reading the numerical results or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10A may implement or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 10A and the nodes and/or client device in FIG. 10B. Other functions may be performed using one or more embodiments of the disclosure.

While the disclosure has been described with respect to a limited number of embodiments, those skilled in the art, having benefit of this disclosure, will now appreciate that other embodiments can be devised which do not depart from the scope of the disclosure as disclosed herein. Accordingly, the scope of the disclosure should be limited only by the attached claims.

Figure 11:
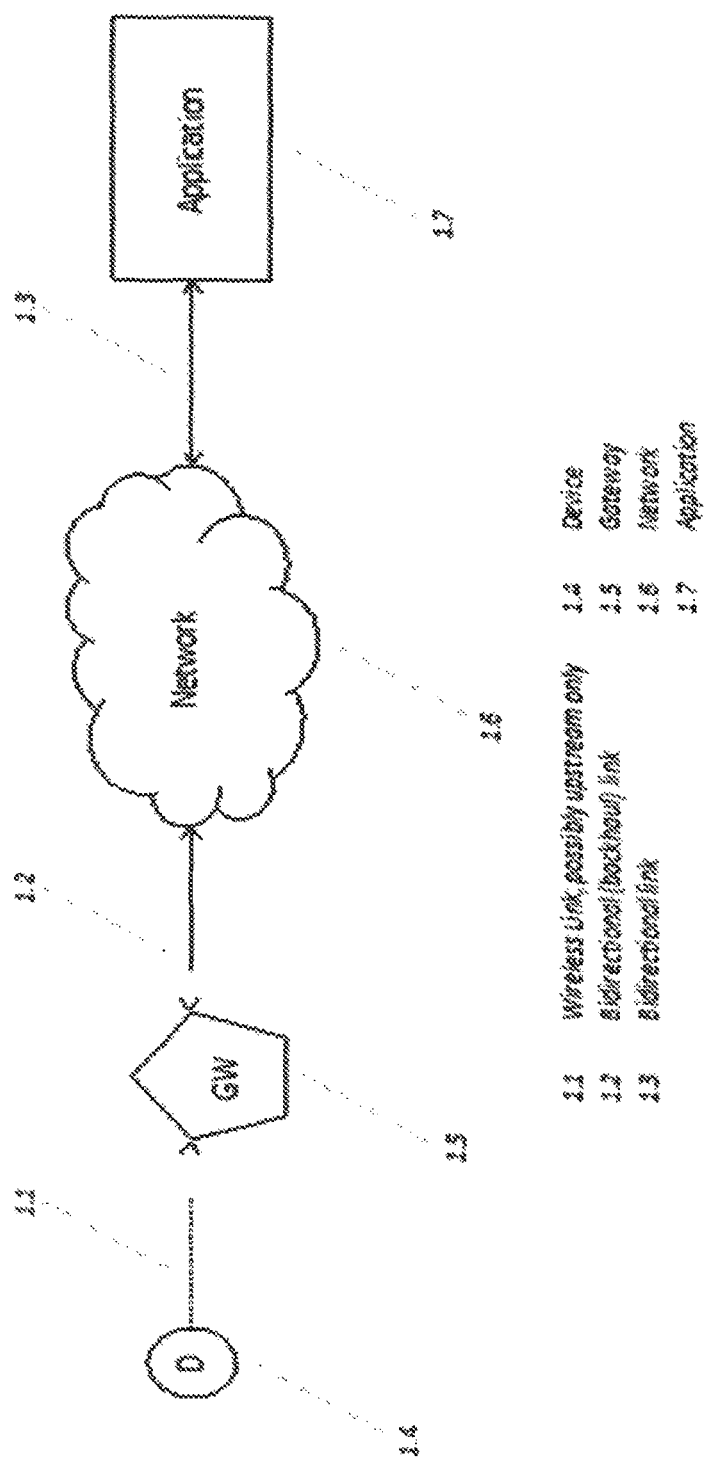
FIG. 11 shows a high-level view of a generic network architecture with one or more embodiments disclosed herein.

Mobile devices with radio communication often regularly and irregularly transmit messages upstream for sending data to some application backend service using some network infrastructure for message relay (network, for short) operated by some network operator (see e.g., FIG. 11). In some cases, communication is one-way, that is, the device never receives messages downstream from the application backend service but only sends different types of data upstream to the application backend service. In other cases, the device and the application backend exchange messages both upstream and downstream. The data sent upstream hereby can be, for example, sensor readings like temperature, humidity, acceleration, or GPS location. Downstream data may be actuator commands or device settings.

For the backend application to properly associate a device as the source of data received, upstream messages typically contain—next to the actual application payload—some unique device address possibly in combination with some unique network address and meta-data such as sequence counters and flags, commonly referred to as Header. It should be noted that the values for some fields of the Header are fixed while others might vary per some algorithm (e.g., simple increment) or based on some device or environmental state. For integrity checking messages may also contain some cryptographic Message Integrity Code (MIC), commonly referred to as Trailer.

In radio infrastructures, such as Low-Power Wide-Area Networks (LPWAN) based on the LoRaWAN protocol specification, the Header and Trailer are typically sent in plain (not encrypted) so that the radio infrastructure can relay upstream messages to the intended receiver based on the unique device address and some owner relationship between the device and some application backend set forth during provisioning of the device. It should be noted that the network operator controlling the network infrastructure hereby might be an entity different from the application owner as it is typically the case for large-scale multi-tenant radio infrastructures that are run by a single network operators and used by many application owners.

Figure 12:
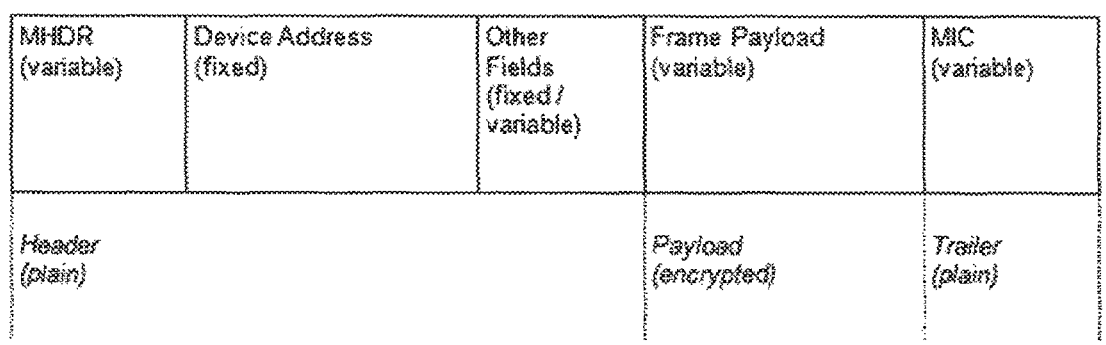
FIG. 12 shows some components of a message with one or more embodiments disclosed herein.

In LoRaWAN, for example, a device sends most of its upstream messages encoded as follows (see FIG. 12):

The integrity of the whole message—Header and payload—is protected by a MIC as Trailer, but only the Frame Payload is encrypted. The MIC is cryptographically calculated by the sending device and verified by the network with a device-specific Network Key only known to the device and the network. The Frame Payload is encrypted by the device with a device-specific Application Key only known to the device and the application owner, that is, only the application owner can decrypt the application data received from a device.

Now, since radio transmissions in general can be listened to by eavesdroppers when on air, the unencrypted Header and Trailer must be considered public information. It is therefore possible to follow and geo-locate a mobile device with certain precision by just listening to its upstream messages and examining transmission meta-data like the Radio Signal Strength Indicator (RSSI) or Signal-to-Noise Ratio (SNR) of messages sent. If the device is attached to a person or some goods, that person or goods then can be unknowingly traced by some third party.

NOTE: This disclosure uses the LoRaWAN protocol only for illustration and clarification of the problem addressed and the solution proposed. The disclosure itself is by no means limited to the LoRaWAN protocol or LoRaWAN LPWAN infrastructure.

As a countermeasure, it is necessary to replace the Header with a constantly changing pseudo-randomly masked Header that can only be associated with the actual device by the network infrastructure but not any eavesdroppers. If the Trailer only contains pseudo-random data like a MIC, it may not need to pseudo-randomised further; otherwise the same scheme as described for the Header below could be applied to the Trailer as well.

Figure 13:
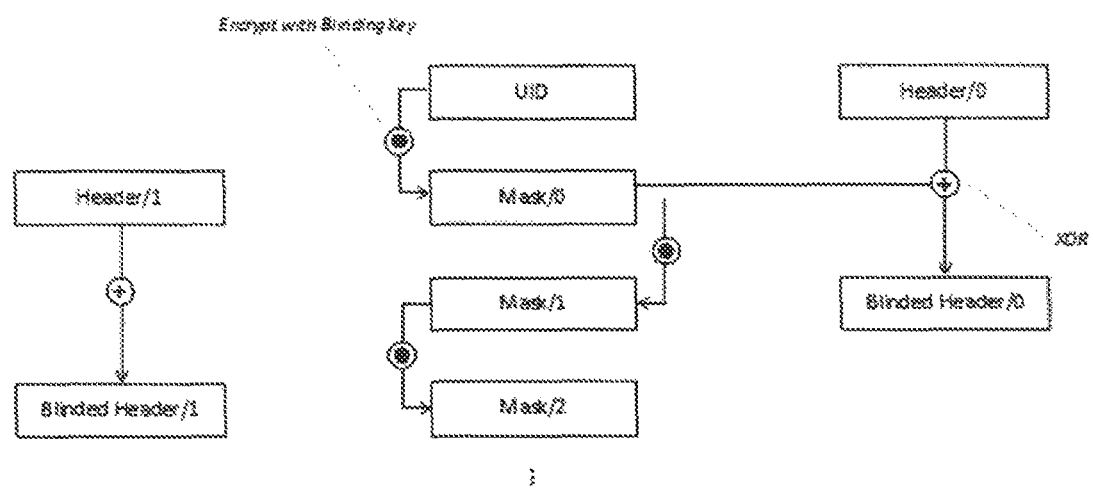
FIG. 13 shows a message blinding procedure with one or more embodiments disclosed herein.

For Header pseudo-randomisation the device is personalised during production with an additional device-specific Blinding Key, which is also made known to the network together with the Device Address and the device-specific Network Key. Now, instead of sending the Header in plain, the device calculates for each message i a pseudo-random Blinding Mask Mask/i by using a cryptographic operation on Mask/i–1 using the Blinding Key, whereby Mask/o is the initial Header of the device. The minimum length of the Blinding Mask hereby is equal to the length of the Header. Afterwards the Header of message i is XORed with Mask/i and the now masked Header replaces the Header of the message (cf. FIG. 13). As a concrete example, the Blinding Key could be an AES key and Mask/i is derived by using an AES encrypt operation on Mask/i–1 with the Blinding Key.

For correctly identifying the device sending an upstream message with a masked Header, the network does the same operation and pre-calculate candidate Headers of the next expected message for its total device population. If the change of collisions is negligible for all practical purposes, the network then can identify the sending device by comparing the fixed fields of the masked Header received with the fixed fields of the pre-calculated candidate Headers. Before relaying the message to the application owner, the network then replaces the masked Header with the unmasked Header by XORing the masked Header with the mask of the correctly identified candidate Header again. This way the blinding is transparent to the application owner.

In general, with very low probability, it could happen that the fixed fields of the masked Header equal the fixed fields of candidate Headers of multiple devices. In this case the masked Header must be unmasked for all those devices one by one and the MIC to be verified. If one and only one MIC verifies, the device is uniquely identified. If more than MIC verifies, which is of extremely low probability, the message cannot be reconstructed and will be dropped. Since the radio scheme already operates under the assumption of sporadic message loss, dropping a single message is of no practical implications provided it is limited to very rare occasions. It should further be noted that the MIC must be always verified to ensure message integrity in general, even if only a single candidate Header is identified.

For some applications, a device further may choose to transmit any upstream messages multiple times, possibly even on different channels, to increase the likelihood that at least one transmission is successful. In this case the Blinding Mask is advanced for every retransmission as well, which again significantly reduces the probability of an upstream message that is unrecoverable due to Blinding Key.

As mentioned, radio communication is prone to message loss due to interference or collisions in the radio spectrum. While some network infrastructure ensures messages delivery by using acknowledgments and retransmissions, this is not practical for most LPWAN environments such as LoRaWAN. To compensate for lost upstream messages, the network will pre-calculate not only the next masked Header but rather a range of n next masked Header candidates. Thereby it can handle up to n–1 messages lost consecutively. Even after that it can try to re-sync by calculating additional masked Header candidates by identifying most likely devices based on historic message upstream patterns considering that most devices send about periodically, although that operation might become prohibitively expensive and the device then would have to be considered lost.

To prevent that devices can get lost in case of n+m (m>=o) consecutively lost messages, the network may periodically re-sync its blinding state to that of the device. For this, devices would have to periodically transmit individual messages with an unmasked Header. When such an unmasked Header is received by the network, it can re-sync its state with the device blinding state and unmask future Headers again. Unmasked Headers hereby ideally should be sent in intervals that make it highly unlikely for an eavesdropper to receive multiple unmasked Headers per device.

NOTE: It is not possible to simply encrypt the message Header since it typically contains some variable fields that still, despite being changing or only being included sporadically, may allow an eavesdropper to conclude the identity of the sending device. Generally, with encryption a single flipped bit in the plain text tends to flip about 50% of the bits in the encrypted text spread out over the encrypted text as a whole. This way, the masked Device Address as part of the Header can no longer be pre-calculated by the network since the network typically cannot predict the values of variable fields.

While the scheme as derived before works for upstream-only devices, it can be applied to devices capable of bidirectional communication and downstream messages likewise with some reservations.

First, if a device requests that network infrastructure acknowledges the reception an upstream message, such an acknowledgement may only be sent after the MIC has been successfully verified. Otherwise, in extremely rare cases, an acknowledgement would be sent even if the message is unrecoverable due to masking. Retransmissions again advance the mask.

Second, the scheme can also be applied to downstream messages using either the same or a second Blinding Key. The computational effort on the device is a bit higher, though, for two reasons: (1) the device must try a potential set of Header candidates for unmasking and verifying the MIC; (2) the device can drop messages for other devices only after trying all candidates. In the case of LoRaWAN, reason (2) won't happen often since devices listen for downstream messages only very sporadically but, depending on the radio scheme used and the specific application constraints (e.g., battery lifetime) it may be an issue.

Third, depending on the number of upstream messages it may be sensible to replace the Blinding Key every now and then. This can be done whenever the device and/or the network decide to renegotiate its device-specific session keys, or independently. This would also prevent that devices can get lost due to n+m consecutively lost upstream messages if the renegotiating is done in a way that next to device-specific session keys also the masking state for the device is renegotiated. In LoRaWAN devices could simply re-join the network over-the-air.

As mentioned, for correctly unmasking upstream messages the network on principle must pre-calculate possibly multiple Header candidates per device for its whole device population. For devices sending in somewhat predictable patterns, and with those patterns either made aware to the network upfront or learned by the network itself over time, the network may limit its search for the sending device to likely candidate groups. If no device can be identified within the candidate group or the MIC does not verify for an identified candidate (possibly due to a highly unlikely but still possible collision as described before), the network must broaden its search.

A fully blinded Header obviously prevents a device from roaming unless the device's blinding state would be shared with the roaming network infrastructure. Alternatively, if the Header as in LoRaWAN contains a network identifier of the home network, that network identifier might be kept in plain (not blinded) so that the roaming network can simply forward messages based on the network identifier to the home network. Unless the population of roamed devices from the same network is small, privacy would still be preserved.

While blinding the Header eliminates the most obvious source for identifying messages sent by the same device, the sending behaviour of the device still might reveal its identity with some probability due to other (almost) unique patterns in its communication. Messages might be sent strictly periodical of always the same length within the same radio channel at the same data rate with the same transmit power. For further increased privacy, a device could pseudo-randomise all these parameters by varying the send times by some pseudo-random positive or negative delay, adding some payload padding of pseudo-random length, pseudo-randomly hop channels, change data rates and adjust transmit power. A device may even intersperse purely randomised messages to be filtered at the application level although at the cost of reduced battery life.

Finally, next to being privacy-preserving, blinding Headers has the advantage that the actual population of devices in a network or within a given region is hidden since every device effectively impersonates as a different device with each upstream message. This may be a side effect important for network operators who do not want to reveal the number of devices within their network to their competition for various reasons.

What is claimed is:

1. A method for transmitting low power wide area networking protocol message frames, comprising:
generating, by an end device comprising a processor, a first frame portion of a message frame of the low power wide area networking protocol message frames comprising
a first plain header and a first encrypted payload, the first plain header and the first encrypted payload collectively representing a portion of a physical payload of the message frame, wherein the first plain header contains destination and source routing information and comprises at least a frame header (FHDR) having a device address (DevAddr), and wherein the first encrypted payload is an encrypted form of a frame payload, the frame payload comprising content from a source device;
obtaining a device identifier (DevEUI) and a header blinding key (HdrBKey) of the source device;
generating a first header mask by performing a cryptographic operation on the DevEUI using the HdrBKey;
generating a first blinded header by applying the first header mask to the first plain header, the first blinded header comprising an encrypted form of at least the FHDR including the DevAddr;
generating a first updated portion of the message frame by replacing the first plain header with the first blinded header, the first updated portion of the message frame comprising the first blinded header and the first encrypted payload;
generating a first blinded message frame comprising the first updated frame portion;
transmitting the first blinded message frame to a network gateway, wherein the header binding key (HdrBKey) is known only to the end device and to a network host;
generating, by the end device, a second frame portion of a second message frame of the low power wide area networking protocol message frames comprising a second plain header;
generating a second header mask using the first header mask and the HdrBKey;
generating a second blinded header by applying the second header mask to the second plain header;
generating a second updated portion of the second message frame by replacing the second plain header with the second blinded header;
generating a second blinded message frame comprising the second updated portion; and
transmitting the second blinded message frame to the network gateway.

2. The method of claim 1, wherein the DevEUI and the HdrBKey are each specific to the end device.

3. The method of claim 1, wherein generating the first blinded header comprises performing a bitwise exclusive OR (XOR) operation between the first header mask and the first plain header.

4. The method of claim 1, further comprising:
generating, by the end device, a join request message comprising the DevEUI;
transmitting the join request message towards the network host;
receiving, from the network host, an encrypted join accept message comprising a network identifier (NetID);
extracting the NetID by decrypting the encrypted join accept message; and
deriving the HdrBKey using at least an application key (AppKey) and the NetID.

5. A system, comprising:
a network gateway;
an end device comprising a first communication interface and a first processor on which a first blinding filter is executing, wherein the end device is operatively connected to the network gateway, wherein the first processor is configured to:
generate a first message frame portion comprising a first plain header, the first plain header containing destination and source routing information;
obtain a device identifier (DevEUI) and a header blinding key (HdrBKey), wherein the header binding key (HdrBKey) is known only to the end device and to a network host;
generate, using the first blinding filter, a first header mask using the DevEUI and the HdrBKey;
obtain, a first blinded header by applying the first header mask to the first plain header;
obtain a first updated message frame portion by updating the first message portion using the first blinded header;
generate a first blinded message frame comprising the first updated message frame portion;
transmit, using the first communication interface, the first blinded message frame to the network gateway;
an application system; and
the network host comprising a second communication interface and a second processor on which a second blinding filter is executing, wherein the network host is operatively connected to the network gateway and the application system, wherein the second processor is configured to:
obtain, for each end device of a device population, the DevEUI, the HdrBKey, and a device address (DevAddr);
obtain, using the second blinding filter, a set of second header masks by generating, for each end device of the device population, a second header mask using the DevEUI and the HdrBKey;
generate, for each end device of the device population, a first candidate plain header (CPH) comprising the DevAddr;
obtain, using the second blinding filter, a set of first candidate blinded headers (CBHs) by applying, for each end device of the device population, the second header mask to the first CPH;
obtain, using the second communication interface and from the network gateway, a message frame comprising a second blinded header;
compare the second blinded header to each first CBH of the set of first CBHs;
identify, based on the comparing, a first fixed-bit-matching CBH of the set of first CBHs comprising a first set of fixed bits that match a second set of fixed bits included in the second blinded header;
obtain a second plain header by applying one second header mask of the set of second header masks to the second blinded header, wherein the one second header mask corresponds to the first fixed-bit-matching CBH;
obtain an unblinded message frame by updating the message frame using the second plain header; and
transmit, using the second communication interface, the unblinded message frame to the application system.

6. A method for transmitting low power wide area networking protocol message frames, comprising:
generating, by an end device comprising a processor, a first frame portion of a message frame of the low power wide area networking protocol message frames comprising
a first plain header and a first encrypted payload, the first plain header and the first encrypted payload collectively representing a portion of a physical payload of the message frame, wherein the first plain header contains destination and source routing information and comprises at least a frame header (FHDR) having a device address (DevAddr), and wherein the first encrypted payload is an encrypted form of a frame payload, the frame payload comprising content from a source device;
obtaining a device identifier (DevEUI) and a header blinding key (HdrBKey) of the source device;
generating a first header mask by performing a cryptographic operation on the DevEUI using the HdrBKey;
generating a first blinded header by applying the first header mask to the first plain header, the first blinded header comprising an encrypted form of at least the FHDR including the DevAddr;
generating a first updated portion of the message frame by replacing the first plain header with the first blinded header, the first updated portion of the message frame comprising the first blinded header and the first encrypted payload;
generating a first blinded message frame comprising the first updated frame portion;
transmitting the first blinded message frame to a network gateway, wherein the header binding key (HdrBKey) is known only to the end device and to a network host;
prior to generating the first frame portion, receiving, by the end device, the DevEUI during a manufacturing process of the end device;
receiving, by the end device, the HdrBKey during the manufacturing process of the end device;
generating, by the end device, a join request message comprising the DevEUI;
transmitting the join request message towards the network host;
receiving, from the network host, an encrypted join accept message comprising a network identifier (NetID); and
extracting the NetID by decrypting the encrypted join accept message; and
deriving the HdrBKey using at least an application key (AppKey) and the NetID;
wherein deriving the HdrBKey comprises performing a cryptographic operation on at least the NetID using the AppKey, wherein the cryptographic operations entails a symmetric cipher.

7. A method for transmitting low power wide area networking protocol message frames, comprising:
  generating, by an end device comprising a processor, a first frame portion of a message frame of the low power wide area networking protocol message frames comprising
    a first plain header and a first encrypted payload, the first plain header and the first encrypted payload collectively representing a portion of a physical payload of the message frame, wherein the first plain header contains destination and source routing information and comprises at least a frame header (FHDR) having a device address (DevAddr), and wherein the first encrypted payload is an encrypted form of a frame payload, the frame payload comprising content from a source device;
  obtaining a device identifier (DevEUI) and a header blinding key (HdrBKey) of the source device;
  generating a first header mask by performing a cryptographic operation on the DevEUI using the HdrBKey;
  generating a first blinded header by applying the first header mask to the first plain header, the first blinded header comprising an encrypted form of at least the FHDR including the DevAddr;
  generating a first updated portion of the message frame by replacing the first plain header with the first blinded header, the first updated portion of the message frame comprising the first blinded header and the first encrypted payload;
  generating a first blinded message frame comprising the first updated frame portion;
  transmitting the first blinded message frame to a network gateway, wherein the header binding key (HdrBKey) is known only to the end device and to a network host;
  receiving, by the end device and from the network gateway, a second blinded message frame comprising a second blinded header;
  generating a second header mask using the first header mask and the HdrBKey;
  obtaining a second plain header by decrypting the second blinded header by the second header mask; and
  obtaining a second message frame by updating the second blinded message frame using the second plain header,
  wherein generating the second header mask comprises performing a cryptographic operation on the first header mask using the HdrBKey, wherein the cryptographic operation entails a symmetric cipher.

8. The method of claim 7, wherein obtaining the second plain header comprises performing a bitwise exclusive OR (XOR) operation between the second header mask and the second blinded header.

9. The method of claim 7, wherein obtaining the second message frame comprises replacing the second blinded header of the second blinded message frame with the second plain header.

10. The method of claim 7, further comprising:
  extracting, by the end device, an encrypted frame payload and a first message integrity code (MIC) from the second message frame;
  generating a second MIC using the second plain header, the encrypted frame payload, and a network session key (NwkSKey);
  authenticating the second message frame using the first MIC and the second MIC;
  obtaining, based on the authenticating, a frame payload by decrypting the encrypted frame payload using at least an application session key (AppSKey); and
  executing a set of instructions to reconfigure the end device, wherein the frame payload comprises the set of instructions.

11. The method of claim 10, wherein generating the second MIC comprises performing a cryptographic operation on the second plain header and the encrypted frame payload using the NwkSKey, wherein the cryptographic operation entails a symmetric cipher.

12. The method of claim 10, wherein authenticating the second message frame comprises determining that the first MIC matches the second MIC.

* * * * *